United States Patent [19]

Takemura et al.

[11] Patent Number: 5,019,759

[45] Date of Patent: May 28, 1991

[54] ATTITUDE CONTROL SYSTEM WITH INDEPENDENT CONTROLLERS FOR CONTROLLING ONBOARD UNITS

[75] Inventors: Shinji Takemura, Chiryu; Masaki Mori, Toyota; Tomoaki Katayama, Nagoya; Hideo Kegasa; Kenichi Ohnishi, both of Toyota, all of Japan

[73] Assignee: Aisin Seiki K.K., Aichi, Japan

[21] Appl. No.: 446,960

[22] Filed: Dec. 6, 1989

[30] Foreign Application Priority Data

Dec. 6, 1988 [JP] Japan .................. 63-308599

[51] Int. Cl.$^5$ .............. G05B 19/04; G05D 3/10
[52] U.S. Cl. .................. 318/466; 307/10.1; 364/424.05
[58] Field of Search .......... 364/424.05, 174; 318/603, 466, 568.1; 307/10.1, 40, 41; 296/65.1; 340/825.1, 870.15, 870.16

[56] References Cited

U.S. PATENT DOCUMENTS

| | | | |
|---|---|---|---|
| 3,864,578 | 2/1975 | Lackey | 307/10.1 |
| 4,055,772 | 10/1977 | Leung | 307/10.1 |
| 4,232,231 | 11/1980 | Reed | 307/10.1 |
| 4,538,262 | 8/1985 | Sinniger et al. | 307/10.1 X |
| 4,554,461 | 11/1985 | Oho et al. | 307/10.1 X |
| 4,706,194 | 11/1987 | Webb et al. | 364/424.05 |
| 4,707,788 | 11/1987 | Tashiro et al. | 364/424.05 |
| 4,760,275 | 7/1988 | Sato et al. | 307/10.1 |
| 4,845,415 | 7/1989 | Steely | 318/466 |

OTHER PUBLICATIONS

Ronald L. Mitchell; "A Small Area Network for Cars", MOS Microprocessor Div., Signetics Corp., Feb. 27, 1984.

*Primary Examiner*—Bentsu Ro
*Attorney, Agent, or Firm*—Sughrue, Mion, Zinn Macpeak & Seas

[57] ABSTRACT

An attitude control system controls a seat sliding, a seat reclining, a seat vertical, a head rest, a seat belt anchor, a steering tilting, a steering telescoping and a mirror position or attitude. The system includes a master controller and a slave controller, and a key switch which provides an attitude control command is only connected to the master controller. In response to the attitude control command from the key switch, the master controller delivers an attitude control command which is then transmitted to the slave controller. In order to avoid an interference which may occur between different mechanisms, a sequence in which the attitude control takes place is automatically switched depending on the direction in which the attitude of other mechanisms is controlled or depending on the prevailing controlled status of other mechanisms.

7 Claims, 19 Drawing Sheets

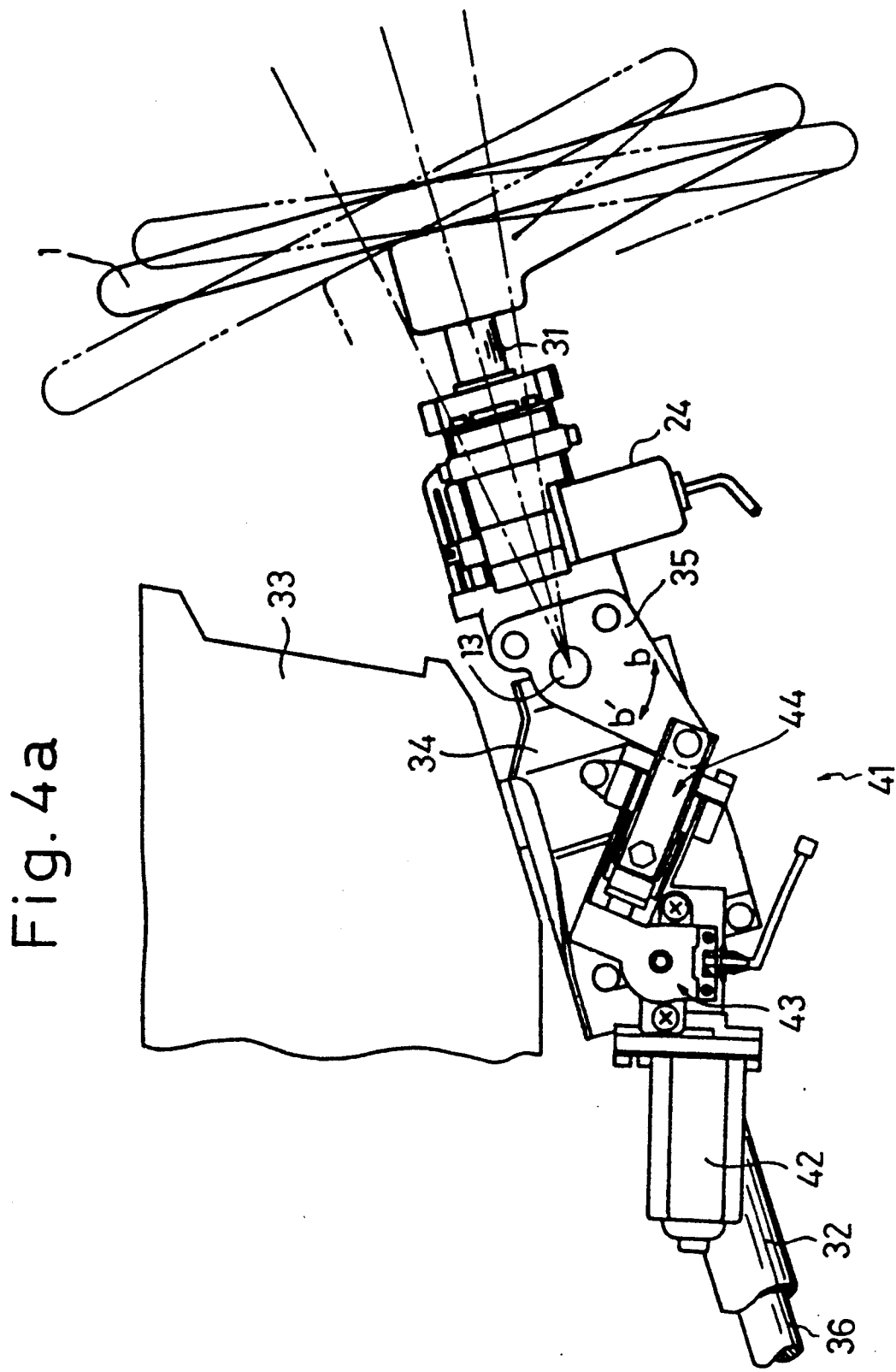

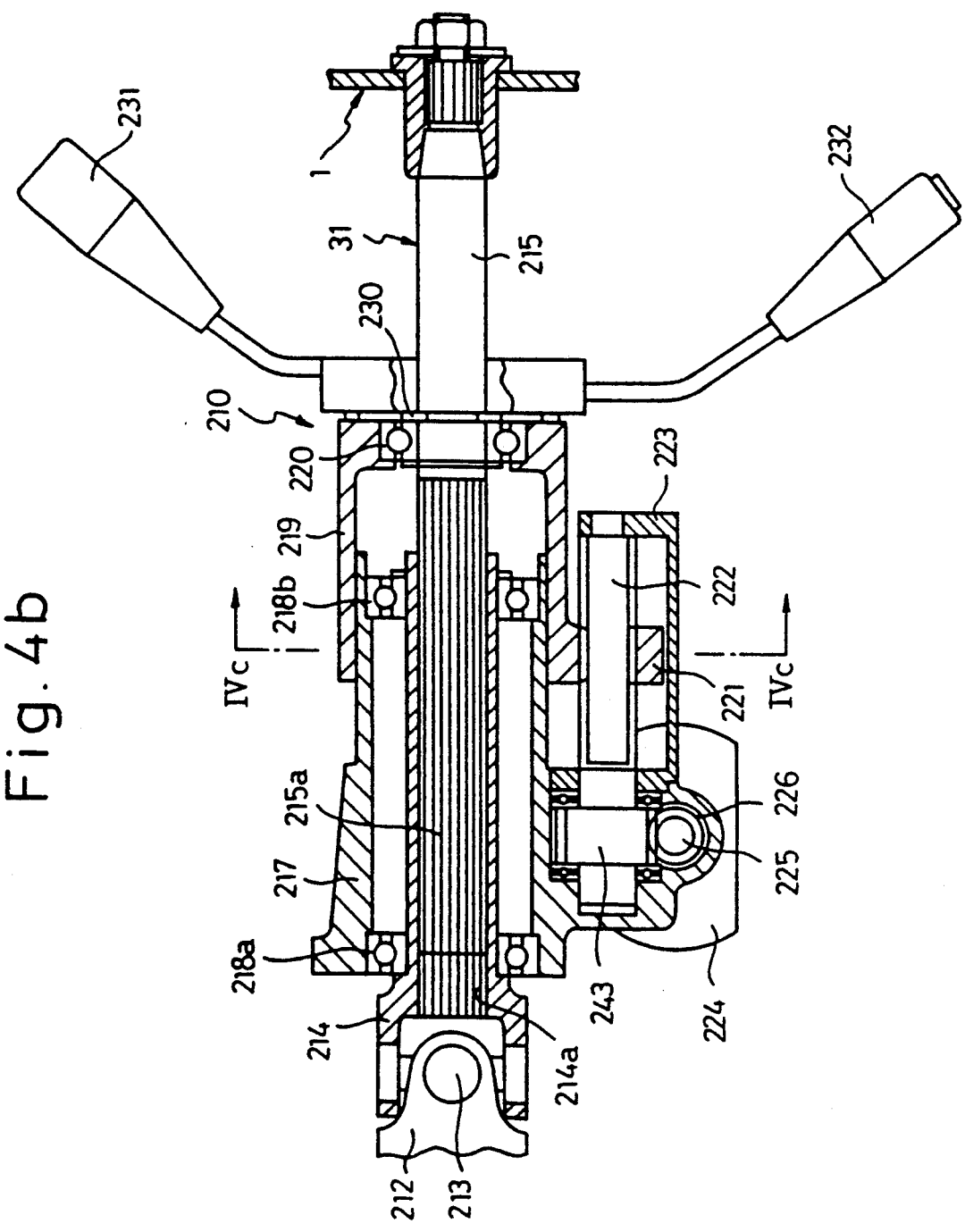

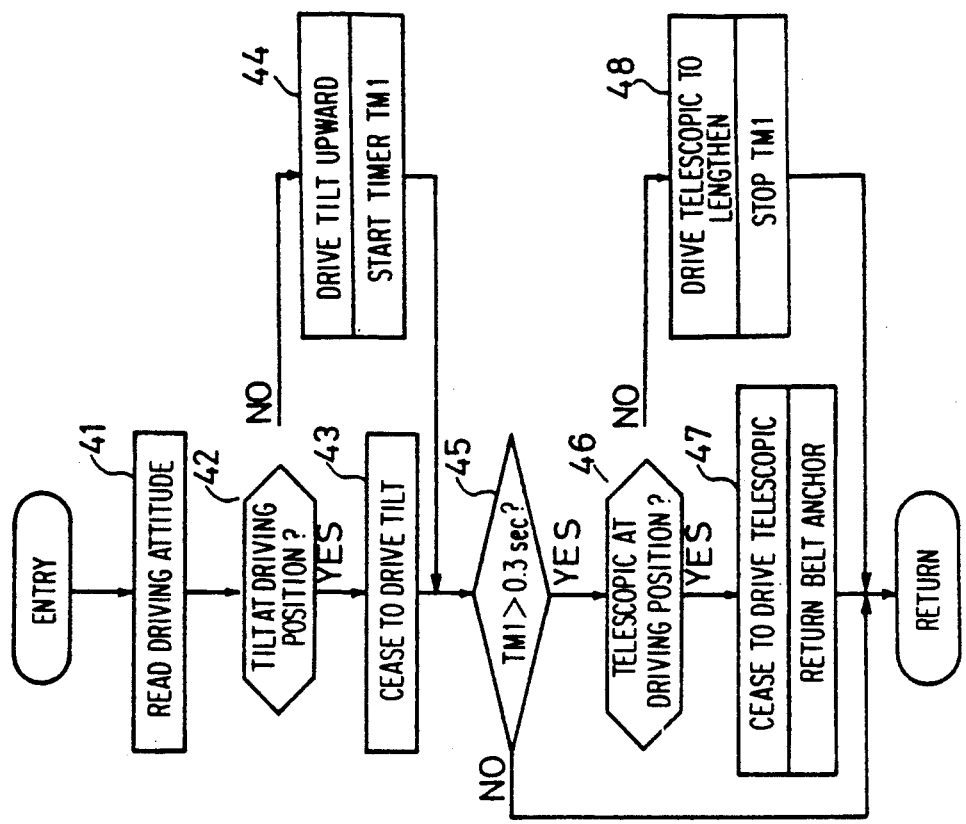
Fig.9c ⟨DRIVING ATTITUDE POSITIONING⟩
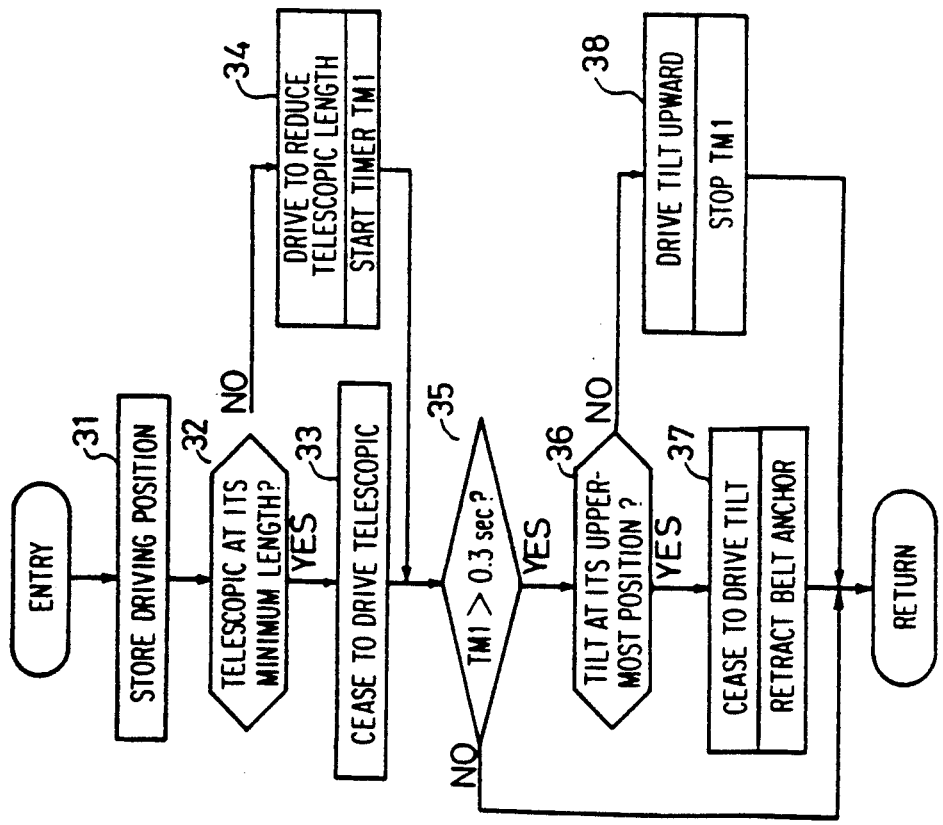
Fig.9b ⟨RETRACT ATTITUDE POSITIONING⟩

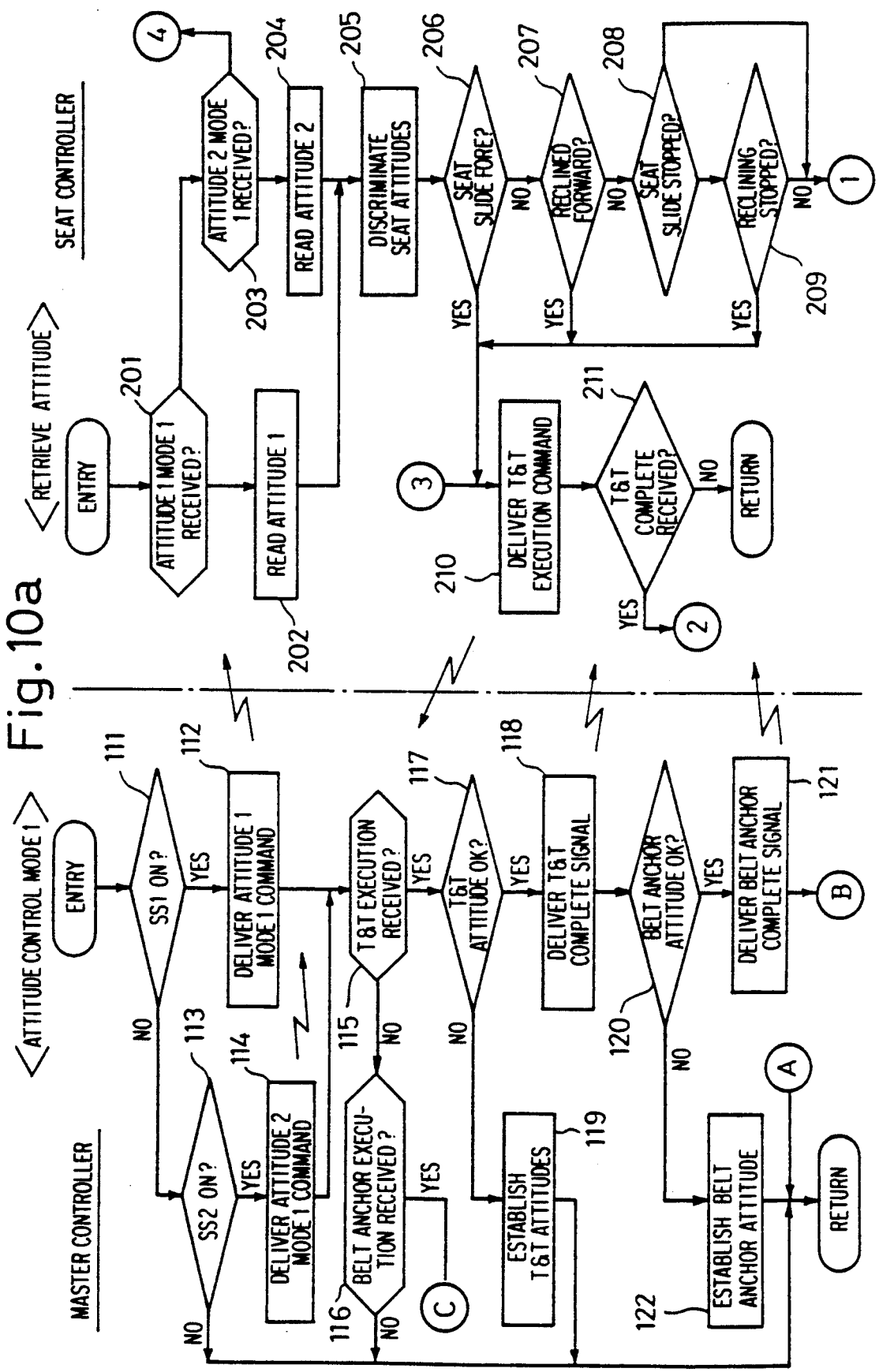

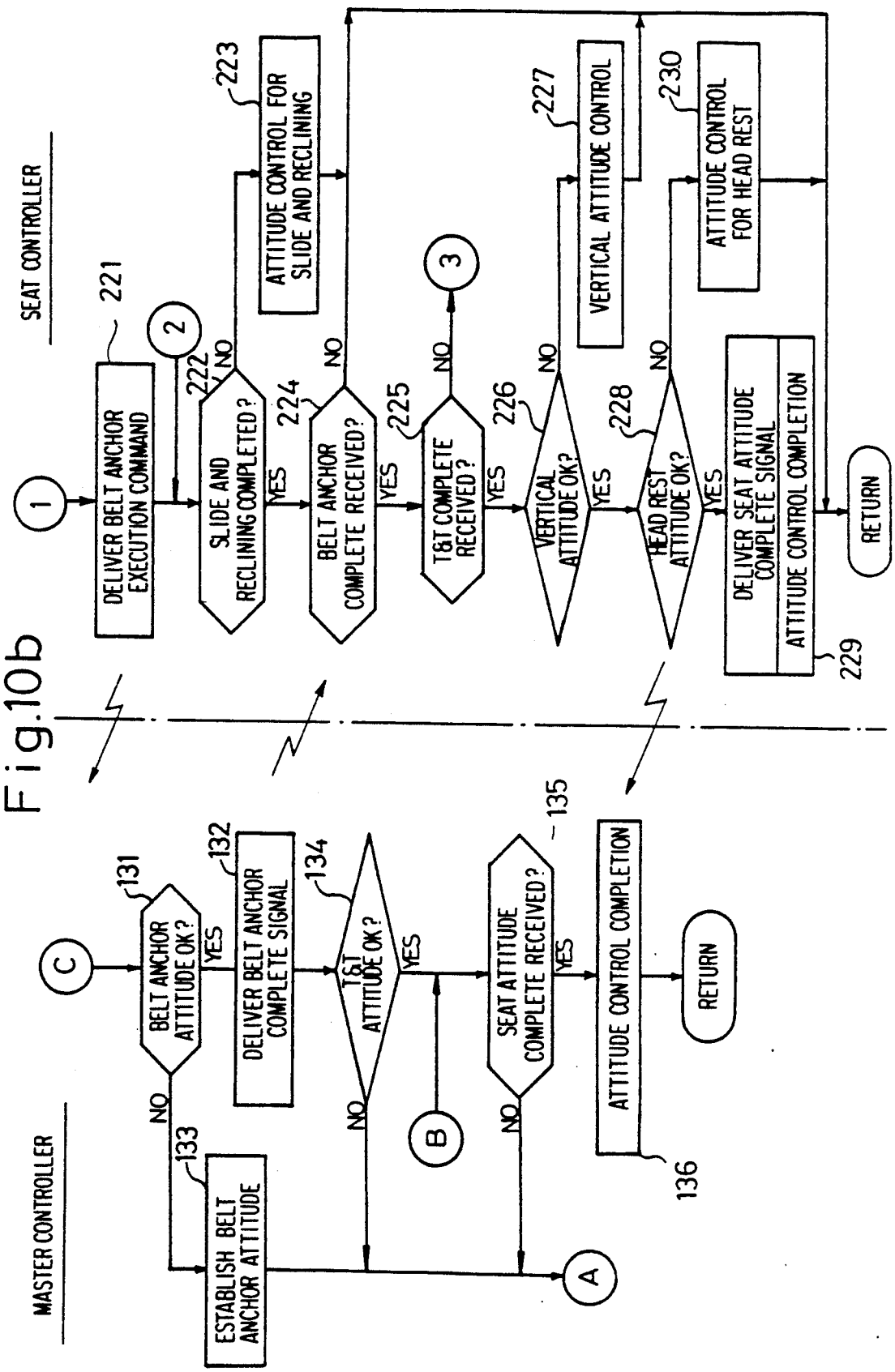

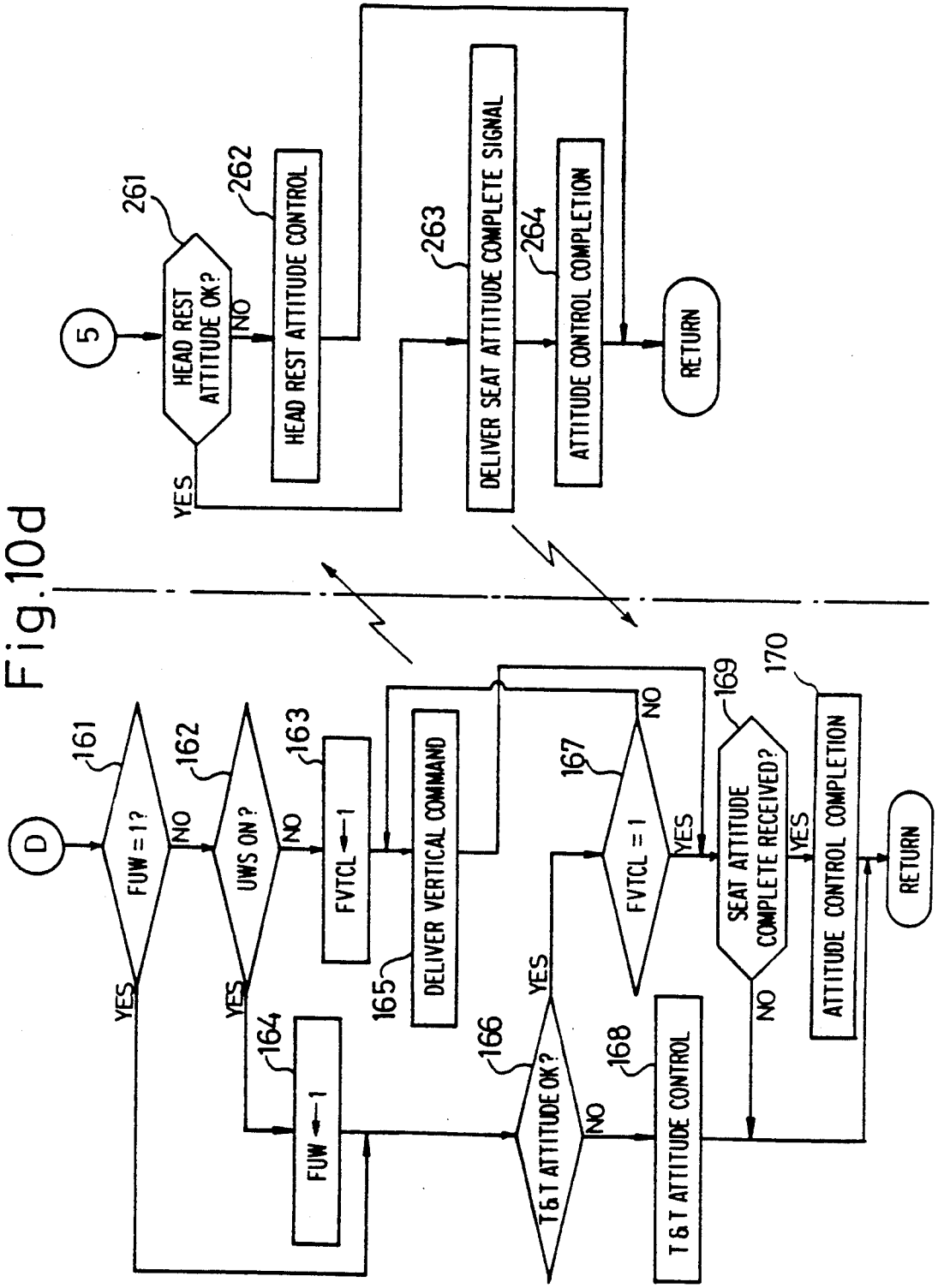

5,019,759

ATTITUDE CONTROL SYSTEM WITH INDEPENDENT CONTROLLERS FOR CONTROLLING ONBOARD UNITS

FIELD OF THE INVENTION

The invention relates to an attitude control system for onboard units such as a driver's seat, a steering wheel, a mirror or the like, and in particular, to such system in which a single attitude control command as delivered by a switch operation is effective to provide instructions to change the attitude of a plurality of target objects to be controlled simultaneously.

BACKGROUND OF THE INVENTION

An apparatus for controlling the attitude of onboard units by driving an electric motor or motors is currently known in various forms. For example, U.S. Pat. No. 4,503,504 discloses an arrangement including a microcomputer for attitude control.

However, it is to be noted that an automobile is recently provided with an increasing number of units or target objects, the attitude of which are to be controlled. By way of example, a driver's seat is associated with a sliding mechanism which positions the seat in the fore-and-aft direction, a front vertical mechanism which adjusts the elevation of the front portion of the seat, a rear vertical mechanism which adjusts the height of the rear portion of the seat, a reclining mechanism for a seat back, a head rest elevation adjusting mechanism or the like, all of which may be driven by electric motors. A tilting mechanism and a telescopic mechanism which are mounted on a steering column to adjust the position of a steering wheel can also be driven by electric motors. Most automobiles are provided with a mechanism which adjusts the position of individual mirrors in the vertical and lateral directions.

When these mechanisms are to be driven by electric motors, it is preferable that a microcomputer be used as a controller. Specifically, the use of a microcomputer enables a variety of safety units to be provided, a number of attitudes to be stored, and allows these units to be driven to selected ones of stored proper positions or attitudes through a single switch operation.

However, it is undesirable that all of a number of onboard attitude control mechanisms be controlled by a single microcomputer. This is because if the task required far exceeds the processing capability of the microcomputer, an increased length of time will be required to execute a single operation, and there will be an increased length of time interval between successive operations, causing a time lag in the control. Thus, it takes a long time until the attitude or position control is actually initiated after a switch operation has been made, or the actuation of a security function may be delayed to cause damage to a unit or units. In addition, when a single controller is used to control a plurality of mechanisms which are widely spaced apart on a vehicle, electric cables of increased lengths must be used to connect the controller with a number of electrical components such as switches, motors, position sensors or the like on these mechanisms which are located at distances from the controller.

A time lag in the control may be reduced by utilizing a plurality of controllers such as microcomputers so that each mechanisms may be controlled by a separate controller, thus reducing the task assigned to each controller. This also allows the independent controllers to be located adjacent to each associated mechanisms with a concomitant reduction in the cable length required. For this reason, a plurality of controllers have been used in the prior art when the position or attitude of various mechanisms are to be controlled electrically.

The attitudes of the seat, the steering wheel and a mirror or mirrors should all be changed in accordance with the physical configuration of a driver or his seating condition. Accordingly, a plurality of proper attitudes corresponding to a plurality of drivers may be stored, and one of these stored attitudes may be retrieved in response to a switch operation. In this instance, switches which are used to issue such command may be used in common to control the attitudes of the seat, the steering wheel and the mirrors. In other words, when a single switch is capable of issuing a command to retrieve one of stored attitudes, such switch may be connected to a seat attitude controller, a steering wheel position controller and a mirror attitude controller in common, thus providing commands t control the attitudes of all of the seat, the steering wheel and the mirror by a single switch operation.

However, when independent controllers are used with individual different mechanisms, and a single attitude controlling switch is connected to the plurality of controllers in common, an inconvenience is experienced. Specifically, since the different controllers operate asynchronously, the status of a single switch will be read at different timings by different controllers. Thus, when a driver turns on the switch for a brief interval, one of the controllers may successfully reads the on status of the switch while the others may fail to read same. In such instance, if a drive operates an attitude controlling switch and the attitude of the seat is properly executed, the position of the mirror may remain uncontrolled. This brings forth a difficulty that the driver may be possessed with an idea that the attitude control is complete, and may notice that the mirror is in an improper position after he has started his vehicle, presenting a difficulty in his driving maneuver.

SUMMARY OF THE INVENTION

Therefore, it is a first object of the invention to provide an attitude control system including a plurality of independent controllers in which a single command operation such as switch operation is effective to control the attitudes of a plurality of mechanisms and wherein a reading of the attitude control command by all the controller is assured.

When an occupant of an automobile gets on and off a vehicle, it is desirable that the positions and/or attitudes of the seat and the steering wheel be moved to their retract positions which differ from their positions assumed when the vehicle is being driven and that when the occupant has completed his mounting operation, their attitudes be returned to the normal driving attitudes. However, under a particular condition of the attitudes of the seat and the steering wheel, it is possible that the seat back comes close to and interferes with the steering wheel. By way of example, on a two-door vehicle, an occupant may get on or off a rear seat by shifting a driver's seat forwardly and turning its seat back in the forward direction. In this instance, the seat back, in particular, a head rest thereof, may move into contact with the steering wheel when the latter assumes a certain attitude.

Therefore, it is a second object of the invention to avoid the occurrence of such contact between different mechanisms as mentioned above when the attitude is being controlled.

The first object is accomplished in accordance with the invention by providing an attitude control system for onboard units comprising a plurality of attitude adjusting means each provided with electrical drive means which is capable of adjusting the attitude of each different onboard unit; at least one switch means for providing an attitude adjusting command to the plurality of attitude adjusting means; master electronic control means connected to the switch means and selected ones of the plurality of attitude adjusting means and operable in accordance with a given control program to control the connected attitude adjusting means and to deliver an attitude adjusting command in response to on/off status of the switch means; and slave electronic control means connected to the master electronic control means and the remainder of the plurality of attitude adjusting means and operable in accordance with a separate control program which is independent from the control program associated with the master electronic control means to control the remainder of the attitude adjusting means in response to an attitude adjusting instruction issued by the master electronic control means.

Specifically, in accordance with the invention, the status of the switch means which issues an attitude adjusting command to the entire system is read by only the master electronic control means, and whenever the master control means recognizes the on status of the switch means or an attitude adjusting command, it delivers an attitude adjusting command to the slave electronic control means. Each of the master and the slave electronic control means may comprise a microcomputer, but since they are operated in accordance with separate and independent operating programs and at different timings, their operation is asynchronous. However, according to the arrangement of the invention, the status of the switch means is read only by the master control means, and an attitude adjusting command is delivered to the slave control means from the master control means only when the latter has recognized an attitude adjusting command from the switch means, so that such command can be reliably transmitted to both the master and the slave control means.

If the on status of the switch means continues for a short time duration which is insufficient to allow the master control means to recognize the occurrence of an attitude adjusting command, such command cannot be transmitted to the slave control means. Whenever the master control means recognizes the occurrence of an attitude adjusting command, the slave control means is also capable of recognizing the occurrence of such an attitude adjusting command. In this manner, the likelihood can be avoided that only one of a first set of attitude adjusting means such as that associated with the steering wheel which is controlled by the master control means and a second set of attitude adjusting means such as that associated with the seat which is controlled by the slave control means is activated to carry out the attitude control while the other set of attitude control means fails to execute such attitude control.

In an embodiment described later, the second object mentioned above is accomplished by causing the master control means to deliver information to the slave control means which represents the attitude of the first set of attitude adjusting means which is controlled by the master control means while the slave control means delivers information to the master control means which represents the attitude of the second set of attitude adjusting means which is controlled by the slave control means. The master control means controls the first set of attitude adjusting means in accordance with the information which represents the attitude of the second set of attitude adjusting means delivered by the slave control means while the slave control means controls the second set of attitude adjusting means in accordance with the information, delivered from the master control means, which represents the attitude of the first set of attitude adjusting means. In this manner, the likelihood of a contact between different attitude adjusting mechanisms is prevented from occurring.

Other objects and features of the invention will become apparent from the following description of an embodiment thereof with reference to the drawings.

BRIEF DESCRIPTION OF THE DRAWINGS

FIG. 4a is a front view of a steering column of the automobile shown in FIG. 2, illustrating the internal construction thereof;

FIG. 4b is a plan view of a telescopic mechanism used in the steering column;

FIG. 4c is a cross section taken along the line IVc—IVc in FIG. 4b;

FIGS. 9a, 9b, 9c, 9d, 9e, 9f, 9g and 9h are flow charts illustrating the operation of a microcomputer 511 used in the master controller shown in FIG. 6;

FIGS. 10a and 10b are flow charts illustrating in detail an attitude adjusting mode 1 of a step 103 shown in FIG. 9h and performed by the master controller and a corresponding operation of the seat controller; and FIGS. 10c and 10d are flow charts illustrating in detail an attitude adjusting mode 2 of a step 107 shown in FIG. 9h and performed by the master controller and a corresponding operation of the seat controller.

PREFERRED EMBODIMENT OF THE INVENTION

Figure 1:
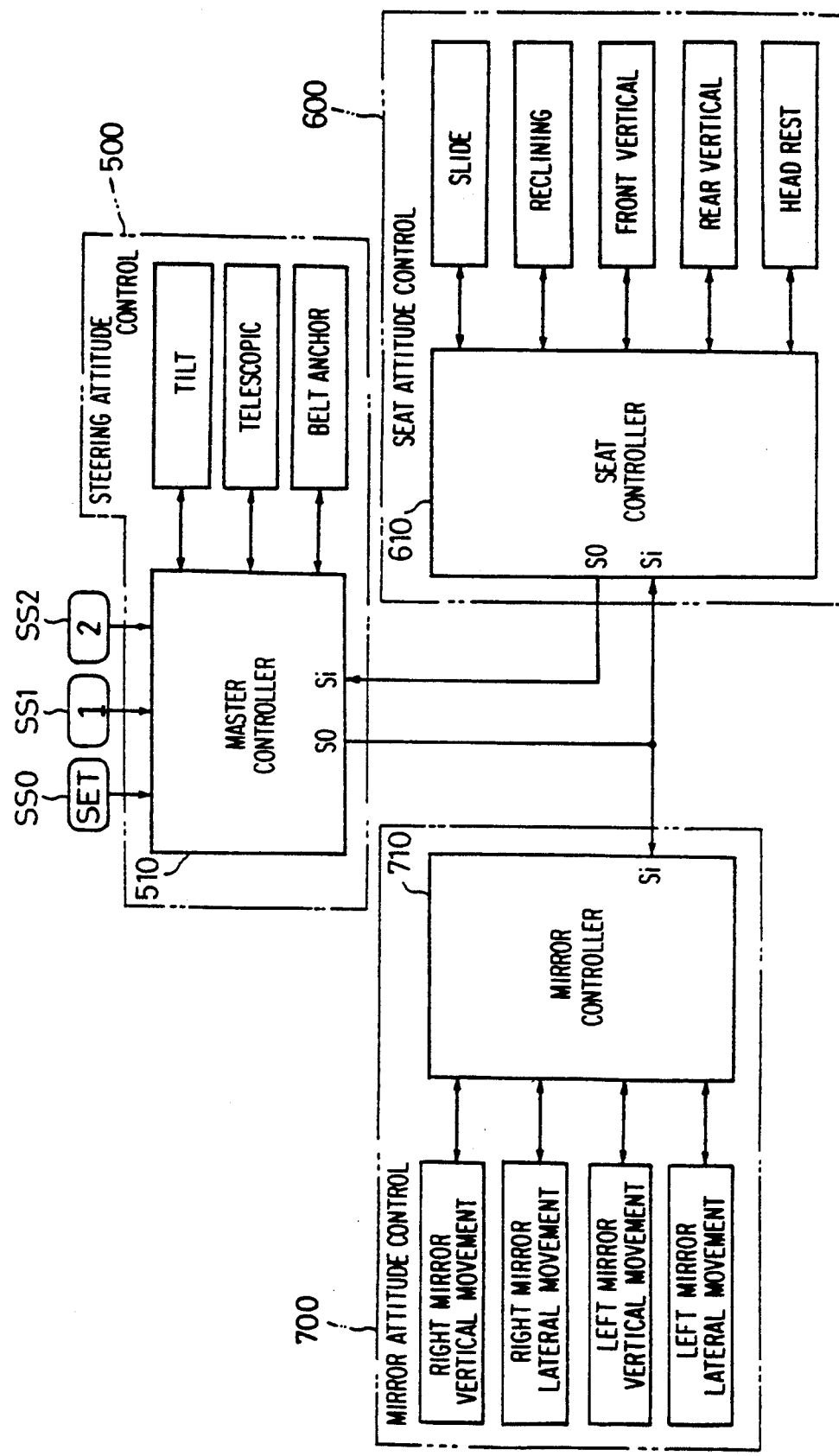
FIG. 1 is a block diagram of an overall attitude control system according to one embodiment of the invention.

FIG. 1 generally shows an overall onboard attitude adjusting system according to an embodiment of the invention. Specifically, the system includes a steering attitude control apparatus 500, a seat attitude control apparatus 600 and a mirror attitude control apparatus 700.

The steering attitude control apparatus 500 includes a tilting mechanism which adjusts the inclination or tilting, as viewed in the vertical direction, of a steering wheel, a telescopic mechanism which adjusts the axial position or length of the steering wheel, and a belt anchor mechanism which adjusts the attitude of a seat belt anchor. All of these mechanisms are controlled by a master controller 510 which includes a microcomputer.

The seat attitude control apparatus 600 includes a sliding mechanism which adjusts the fore-and-aft position of a seat cushion of a driver's seat, a reclining mechanism which adjusts the inclination of a seat back, a front vertical mechanism which adjusts the height of the front portion of the seat cushion, a rear vertical mechanism which adjusts the height of the rear portion of the seat cushion, and a head rest mechanism which adjusts the position or height of a head rest. All of these mechanisms are controlled by a seat controller 610 including a microcomputer.

The mirror attitude control apparatus 700 includes a right mirror tilt mechanism which adjusts a tilting, as viewed in the vertical direction, of a mirror mounted on a right-hand door about a horizontal pivot thereof, a right mirror lateral swing mechanism which adjusts a swinging motion, as viewed in the lateral direction, of the mirror mounted on the right-hand door about a vertical pivot thereof, a left mirror tilt mechanism which adjusts a tilting, as viewed in the vertical direction, of a mirror mounted on a left-hand door about a horizontal pivot thereof, and a left mirror lateral swing mechanism which adjusts a swinging motion, as viewed in the lateral direction, of the mirror mounted on the left-hand door about a vertical pivot thereof. All of these mechanisms are controlled by a mirror controller 710 which includes a microcomputer.

To effect an attitude control over the entire attitude control system, three switches SS0, SS1 and SS2 are connected to the master controller 510. It is to be understood that additional switches are used in actuality, but are omitted for the purpose of simplifying the illustration. Switch SS0 (SET) is used to command the storage of an attitude, and switch SS1 is used to select a first set of attitude storage memories while switch SS2 is used to select a second set of attitude storage memories.

The master controller 510, the seat controller 610 and the mirror controller 710 are interconnected by signal lines for allowing a communication therebetween. Specifically, the master controller 510 has a serial signal output terminal SO which is connected to a serial signal input terminal Si of the seat controller 610 and a serial signal input terminal Si of the mirror controller 610 through a single signal line. The seat controller 610 has a serial signal output terminal SO which is connected to a serial signal input terminal Si of the master controller 610 through a single signal line. Accordingly, bidirectional communication or data transmission is possible between the master controller 510 and the seat controller 610 while a unidirectional communication is allowed between the master controller 510 and the mirror controller 710.

Figure 2:
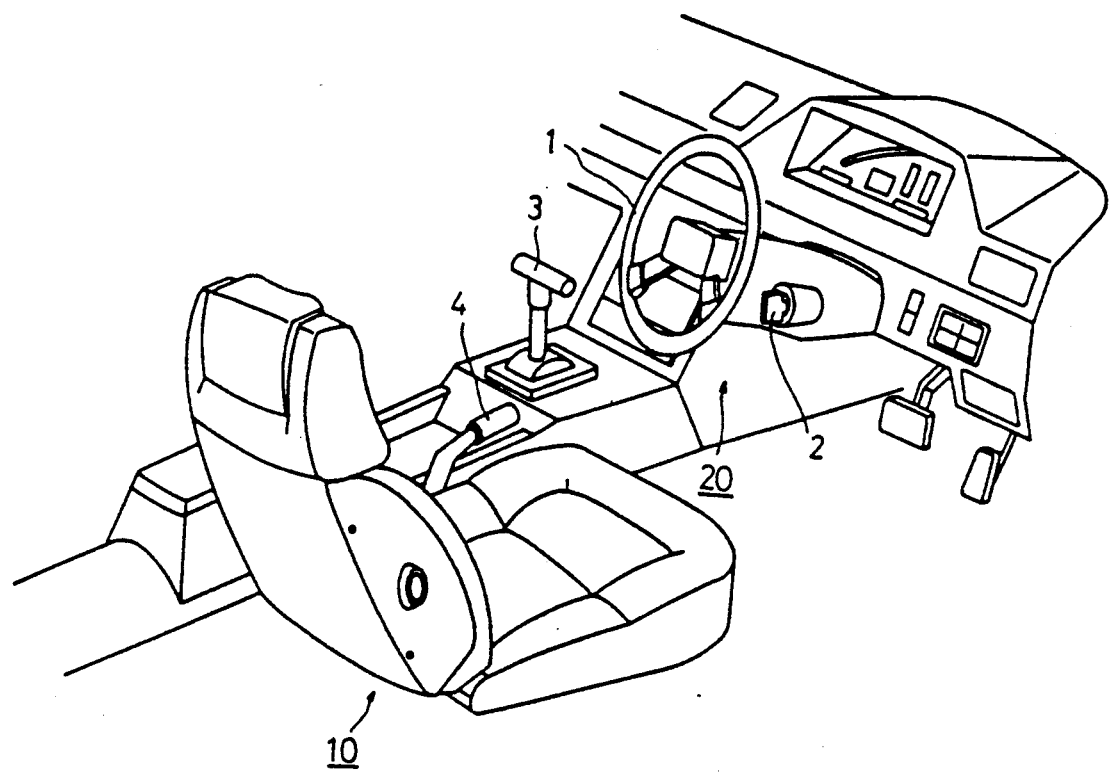
FIG. 2 is a perspective view of part of the internal compartment of an automobile on which the system of FIG. 1 is mounted.

FIG. 2 shows part of a compartment of an automobile on which the attitude control system of FIG. 1 is mounted. There are shown a steering wheel 1, an engine key 2, a shift lever 3, a side brake lever 4, a driver's seat 10 and a steering column 20. The seat 10 is provided with the sliding mechanism, the reclining mechanism, the front vertical mechanism, the rear vertical mechanism, and the head rest mechanism, all of which have been shown in FIG. 1. The steering column 20 is provided with the tilting mechanism and the telescopic mechanism, both shown in FIG. 1.

Figure 3A:
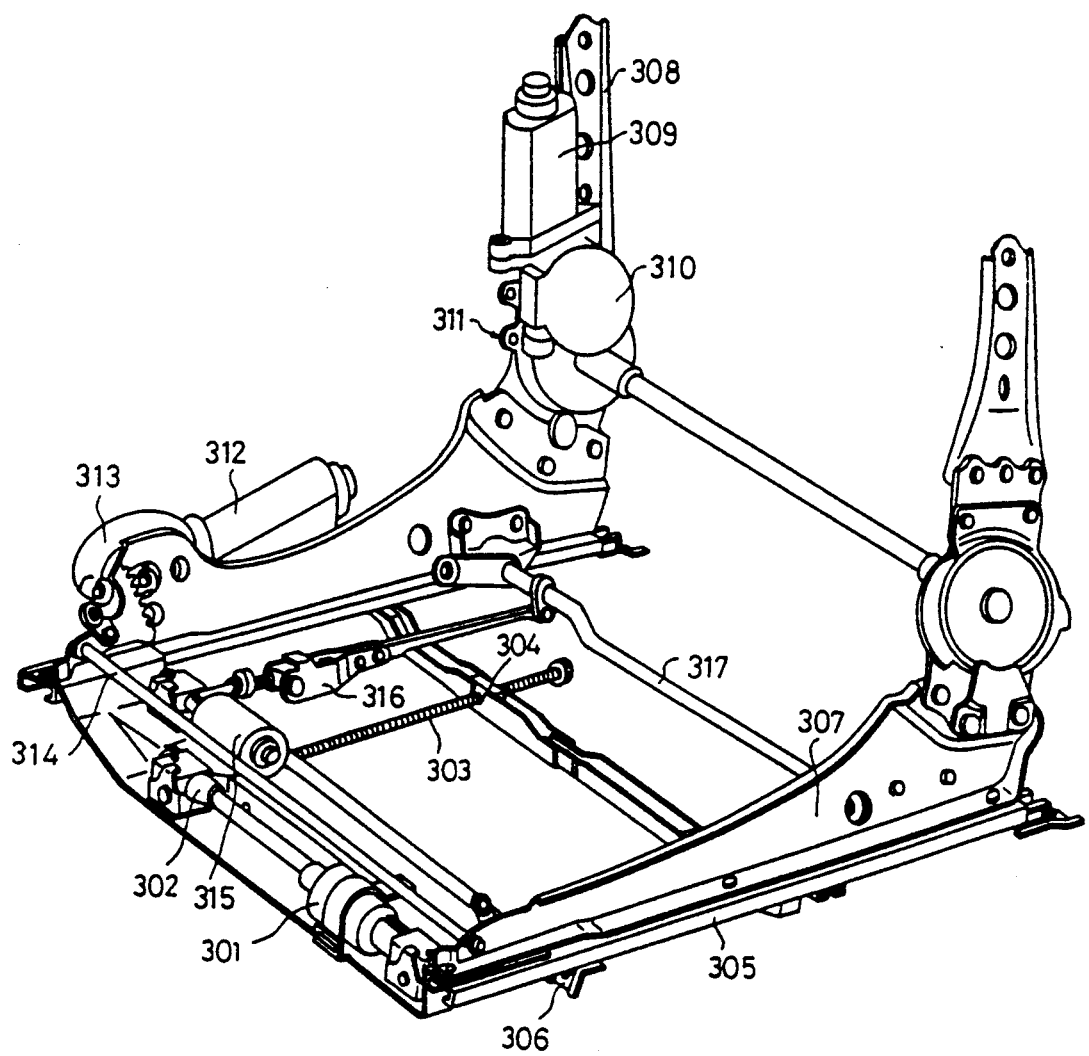
FIGS. 3a and 3b are perspective views of part of a seat attitude adjusting mechanism mounted on a driver's seat shown in FIG. 2.

FIG. 3a shows an attitude adjusting mechanism which is disposed below a seat cushion of the seat 10. Referring to this Figure, there is provided a seat sliding, electric motor 301 (MT4) having an output shaft which is connected through a reduction gear box 302 to a screw 303. A slide rail 305 is disposed below a seat base 307, and is supported by a fixing rail 306, secured to a car body, so as to be slidable in the fore-and-aft direction. A nut 304 is threadably engaged with the screw 303. Both the gear box 302 and the screw 303 are fixedly mounted on the seat base while the nut 304 is secured to the fixing rail 306. Accordingly, when the motor 301 is energized, the screw 303 is driven for rotation through the gear box 302, and resulting motion of the screw with respect to the nut 304 allows the seat base 307, and hence the seat, to slide either forwardly or rearwardly.

A seat back frame 308 is connected to the seat base 307 so as to be swingable about a coupling 311, which is provided with a gear box 310 mechanically connected to the drive shaft of a reclining, electric motor 309 (MT5). Thus, the energization of the motor 309 allows the seat back frame 308 to be swung, relative to the seat base 307, thus changing the inclination of the set back.

A pair of arms 314 and 317 extend laterally across the front and the rear portion of the seat base 307 for elevating the seat cushion. These arms 314, 317 are pivotally mounted on the seat base 307 so as to be movable along an arcuate path about their pivots. The front arm 314 has a gear box 313 coupled thereto, which is in turn connected to the drive shaft of an electric motor 312, which serves the front vertical attitude adjustment. The rear arm 317 is connected through a linkage 316 to the drive shaft of an electric motor 315, which serves the rear vertical attitude adjustment. Thus, the energization of the motor 312 is effective to change the elevation of the arm 314, which in turn changes the elevation of the front portion of the seat cushion. Alternatively, the energization of the motor 315 is effective to change the elevation of the arm 317 and hence the elevation of the rear portion of the seat cushion.

Figure 3B:
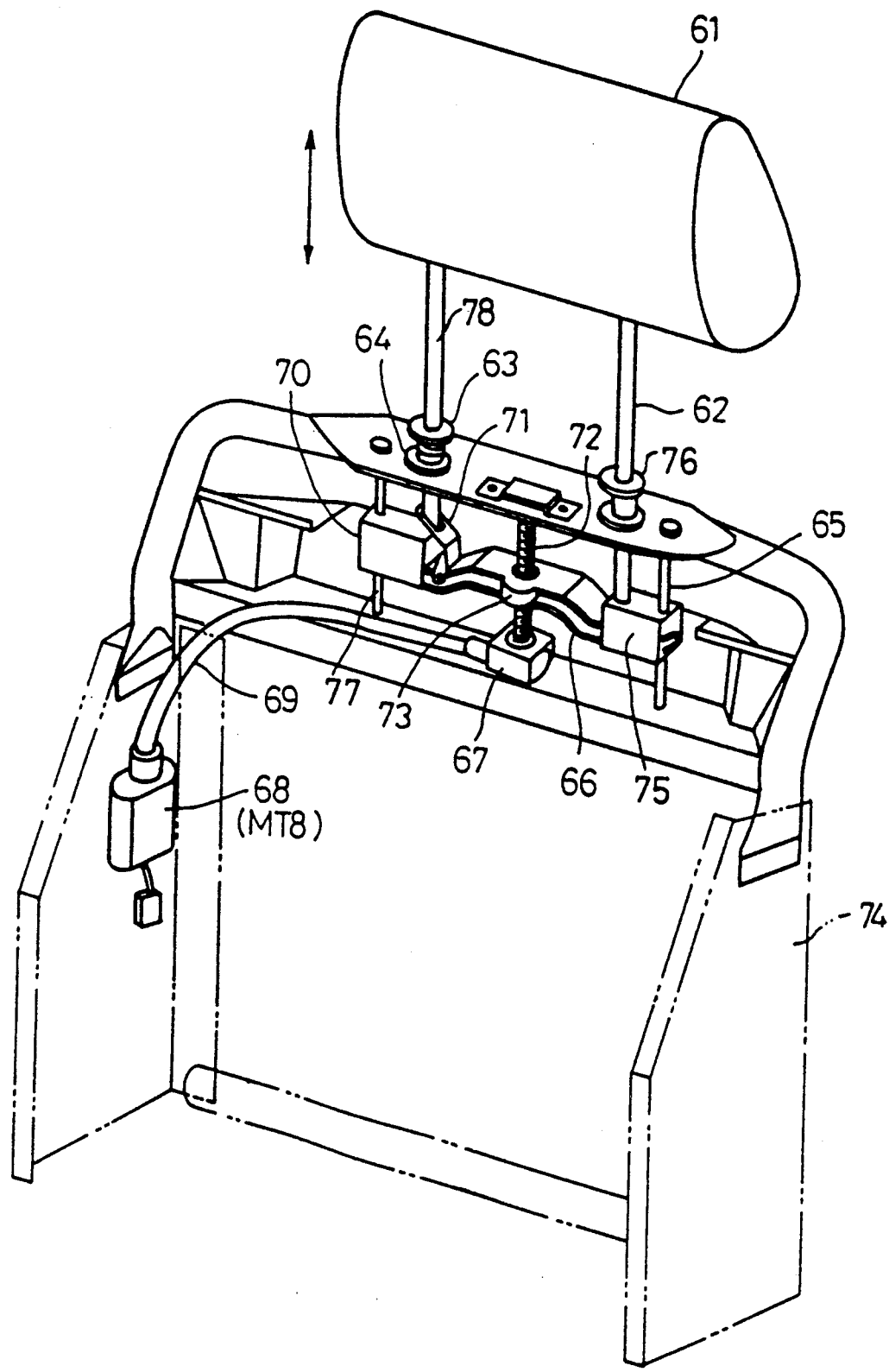

FIG. 3b shows a mechanism which adjusts the attitude or height of a head rest 61 which is mounted on the seat back. Referring to this Figure, the head rest 61 has a pair of rod-shaped stays 62 and 78, which are in turn supported by stay guides 63, 76 fitted through guide holes formed in a seat back frame 74, whereby these stays are displaceable in a vertical direction. The lower ends of the stays 62, 78 are secured to supports 75 and 70, respectively. The supports 70, 75 are disposed to be vertically movable along guide rods 77, 65. The pair of supports 70, 75 are coupled together by an arm 66. The arm 66 centrally carries a nut 73 thereon, which is threadably engaged by a screw 72 supported by the seat back frame 74. The lower end of the screw 72 is coupled to one end of a gear box 67, the other end of which is coupled through a drive cable 69 to the drive shaft of an electric motor 68 (MT8). Accordingly, when the motor 68 is energized, the drive therefrom is transmitted through the cable 69 and the gear box 67 to the screw 72, thus rotating the latter. Such rotation is effective to cause the arm 66, which is coupled to the nut 73, to be displaced vertically, whereby the supports 70 and 75 are driven in vertical direction, thus displacing the stays 62 and 78 vertically and changing the elevation of the head rest 61.

FIG. 4a shows the construction of a steering column Specifically, the steering wheel 1 is mounted on an upper main shaft 31. A tilt steering mechanism 41 adjusts the angular position of the shaft 31 relative to a lower main shaft 36. Specifically, the mechanism 41 comprises a break away bracket 34 mounted below a body 33 which comprises a dashboard, an electric motor 42 (MT1) which is mounted on the bracket 34, a reduction gearing 43 connected to the motor 42, a screw-nut mechanism 44 connected to the gearing 43, and an upper bracket 35 which is pivotally mounted on the break away bracket 34 and driven for rocking motion by the screw-nut mechanism 44. Thus, the energization of the motor 42 is effective to drive the mechanism 44 through the reduction gearing 43, whereby the upper bracket 35 rocks, changing the tilting angle of the steering wheel 1.

A telescopic steering mechanism, which is located nearer the steering wheel 1 than the tilt steering mechanism, is shown in FIG. 4b, and a cross section taken along the line IVc—IVc shown in FIG. 4b is shown in FIG. 4c. Specifically, the upper main shaft 31 comprises a shaft 212, a hollow outer shaft 214 which is connected to the shaft 12 by a joint pin 213, which represents a tilting center, and an inner shaft 215 which is fitted into the outer shaft 214 so as to be displaceable in the axial direction. The left end, as viewed in FIG. 4, of the shaft 212 is connected to a steering gear wheel. The right end, as viewed in FIG. 4b, of the inner shaft 215 is formed with a serration, which is engaged by a support member for the steering wheel 1. Consequently, as the steering wheel 1 is turned, axial serrations 214a, 215a formed in the outer peripheral surface of the inner shaft 215 and the inner peripheral surface of the outer shaft 214, respectively, are effective to cause the both shafts 215, 214 to rotate, thus rotating the main shaft 212.

The outer shaft 214 is rotatably supported by a pair of bearings 218a, 218b on a fixing bracket 217 which is pivotally mounted on a car body by pins, not shown. The inner shaft 215 is supported by a movable bracket 219 through an interposed bearing 220. The movable bracket 219 has its left portion fitted around the right portion of the bracket 217 so as to be displaceable in the lateral direction, as viewed in the drawing. The right portion of the bracket 219 cooperates with a snap ring 230 on the inner shaft 215 to carry the bearing 220 therebetween. At its left end, the lower portion of the movable bracket 219 is formed with a nut 221, which threadably engages with a screw 222 rotatably mounted on the right end of the fixing bracket 217. A support bracket 223 is secured to the fixing bracket 217, covering the screw 222 to secure a space for a free movement of the screw 222. A gear 243 is integrally mounted on the left end of the screw 222, and meshes with a worm gear 226 which is mounted on the drive shaft 225 of an electric motor 224 (MT2). It is to be noted that the motor 224 is mounted on the fixing bracket 217. Thus, when the motor 224 is set in motion, the screw 222 rotates, thus causing the nut 221 to translate axially along the screw 222. In this manner, the movable bracket 219 which carries the nut 221 moves relative to the fixing bracket 217, thus driving the inner shaft 215 into and out of the outer shaft 214 to displace the steering wheel 1 along its axis of rotation.

Figure 5A:
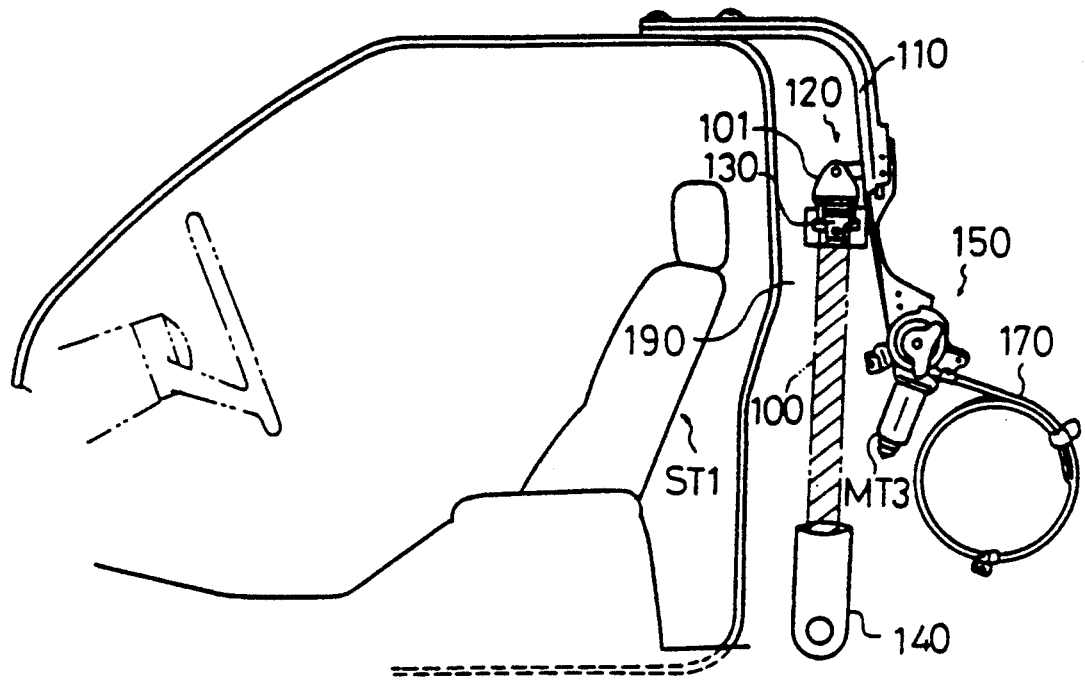
FIGS. 5a and 5b are front views of a seat belt attitude adjusting mechanism used in the automobile shown in FIG. 2.
Figure 5B:
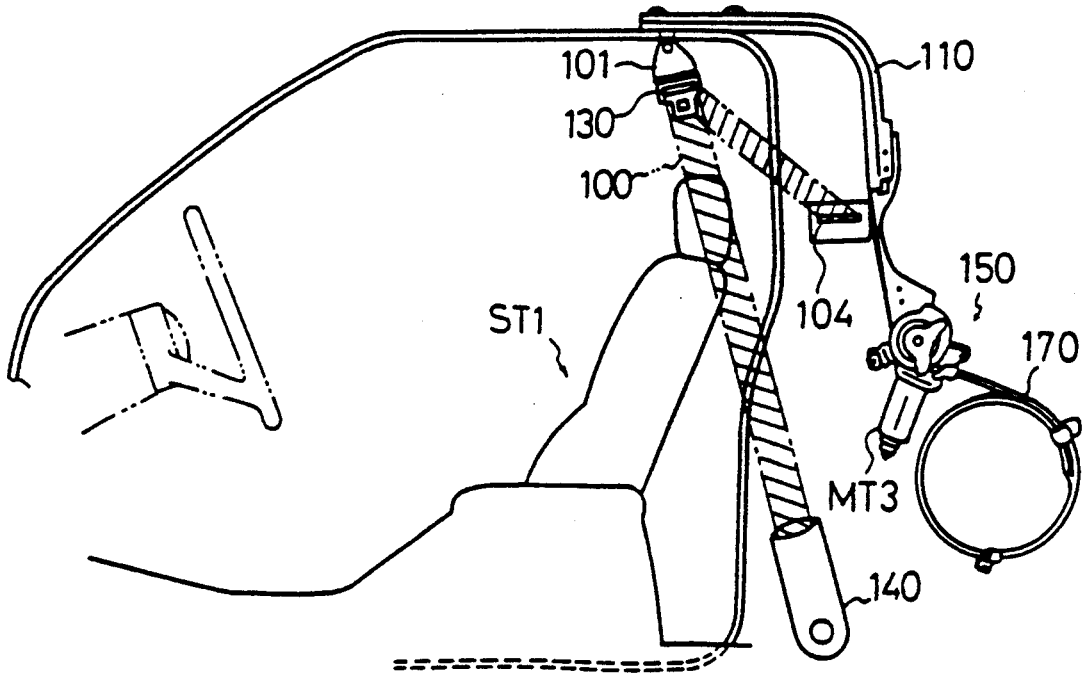

FIGS. 5a and 5b schematically show a seat belt positioning mechanism. Specifically, a rail 110 is laid along part of the perimeter of a door opening through which a driver gets on or off the vehicle, or along the upper corner of a center pillar 190. A shoulder anchor 101 is mounted on top of the pillar and is engaged by a slider 120 which moves back and forth along the rail 110. One end of a seat belt 100 is fixedly connected to a wrap outer anchor 140 which is pivotally mounted on a car body while the other end passes through a belt opening formed in the shoulder anchor 101 to extend into the center pillar where it is taken up by a take-up unit, not shown, which is disposed in the bottom of the center pillar 190. The take-up unit includes an inertia lock mechanism which becomes locked whenever a tension is rapidly applied to the seat belt 100. The seat belt 100 is engaged by a tongue plate 130 in a movable manner, and is also provided with a stop, not shown, which prevents the tongue plate from falling down. The slider 120 is coupled to a drive mechanism including an electric motor MT3. When the motor MT3 is energized, the slider 120 is driven for movement, whereby the seat belt 100 is driven to its lowered position (retracted attitude) shown in FIG. 5a or to a raised position (worn attitude) shown in FIG. 5b.

Figure 6:
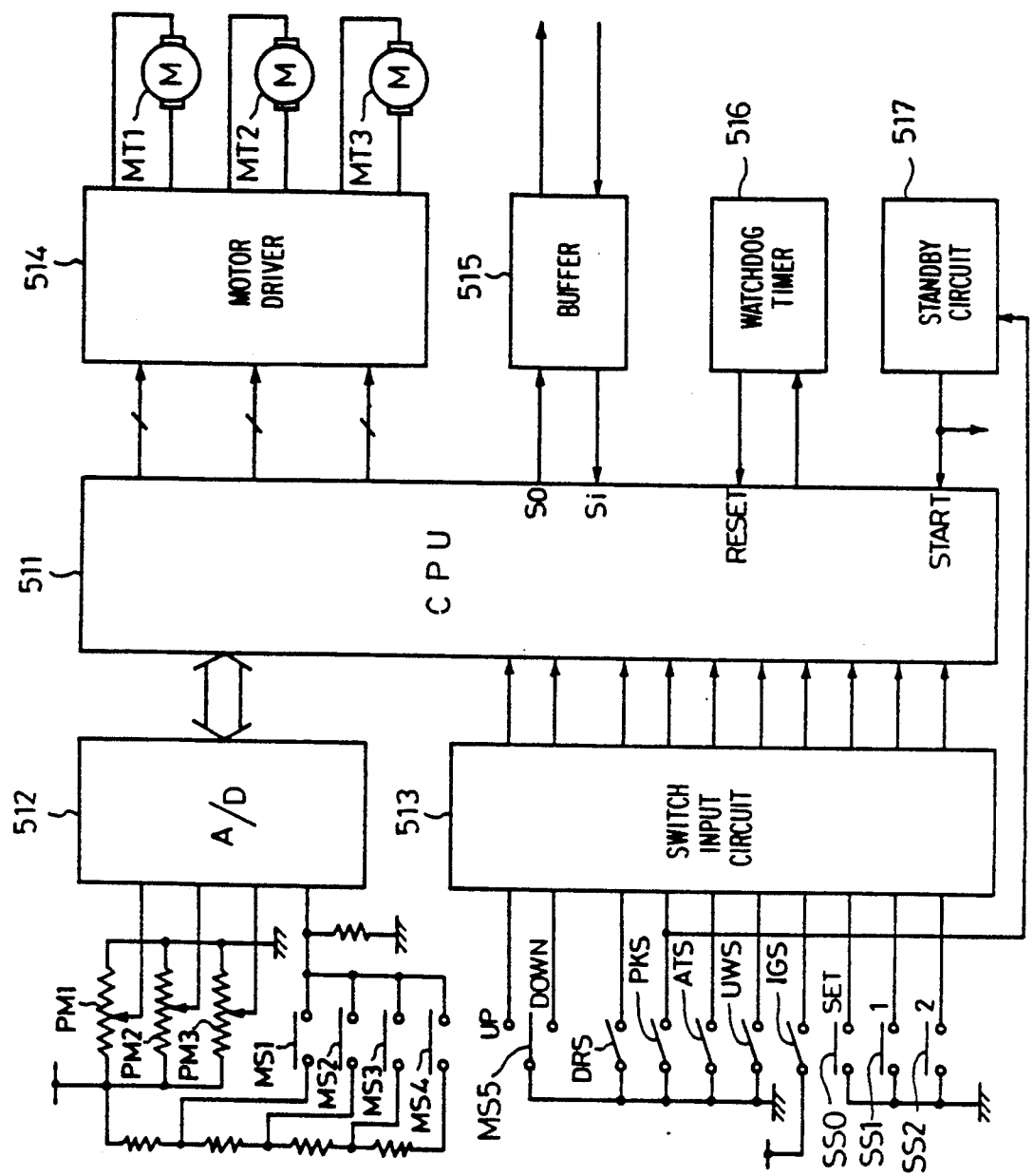
FIGS. 6, 7 and 8 are block diagrams of a master controller, a seat controller and a mirror controller.
Figure 7:
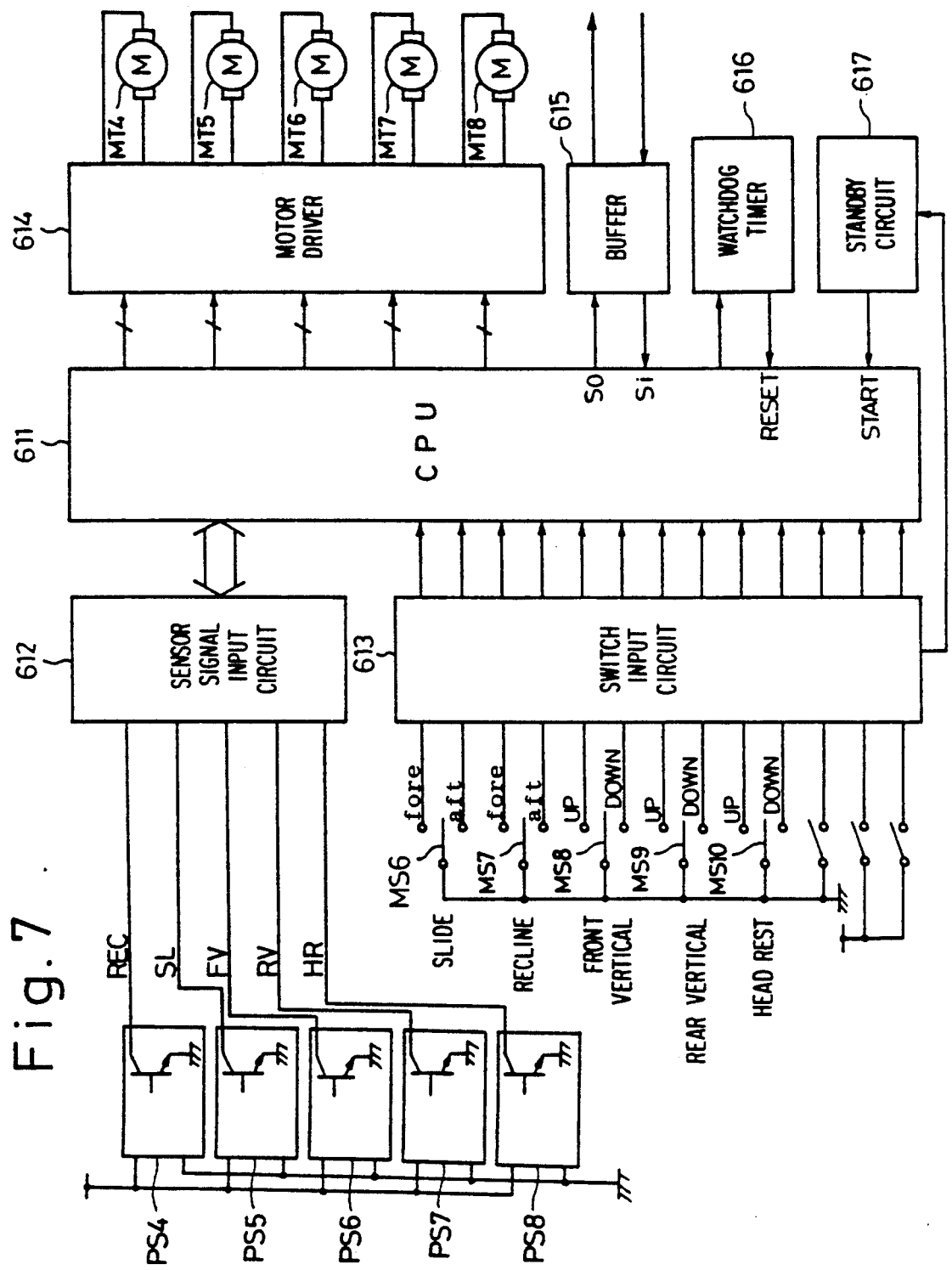
Figure 8:
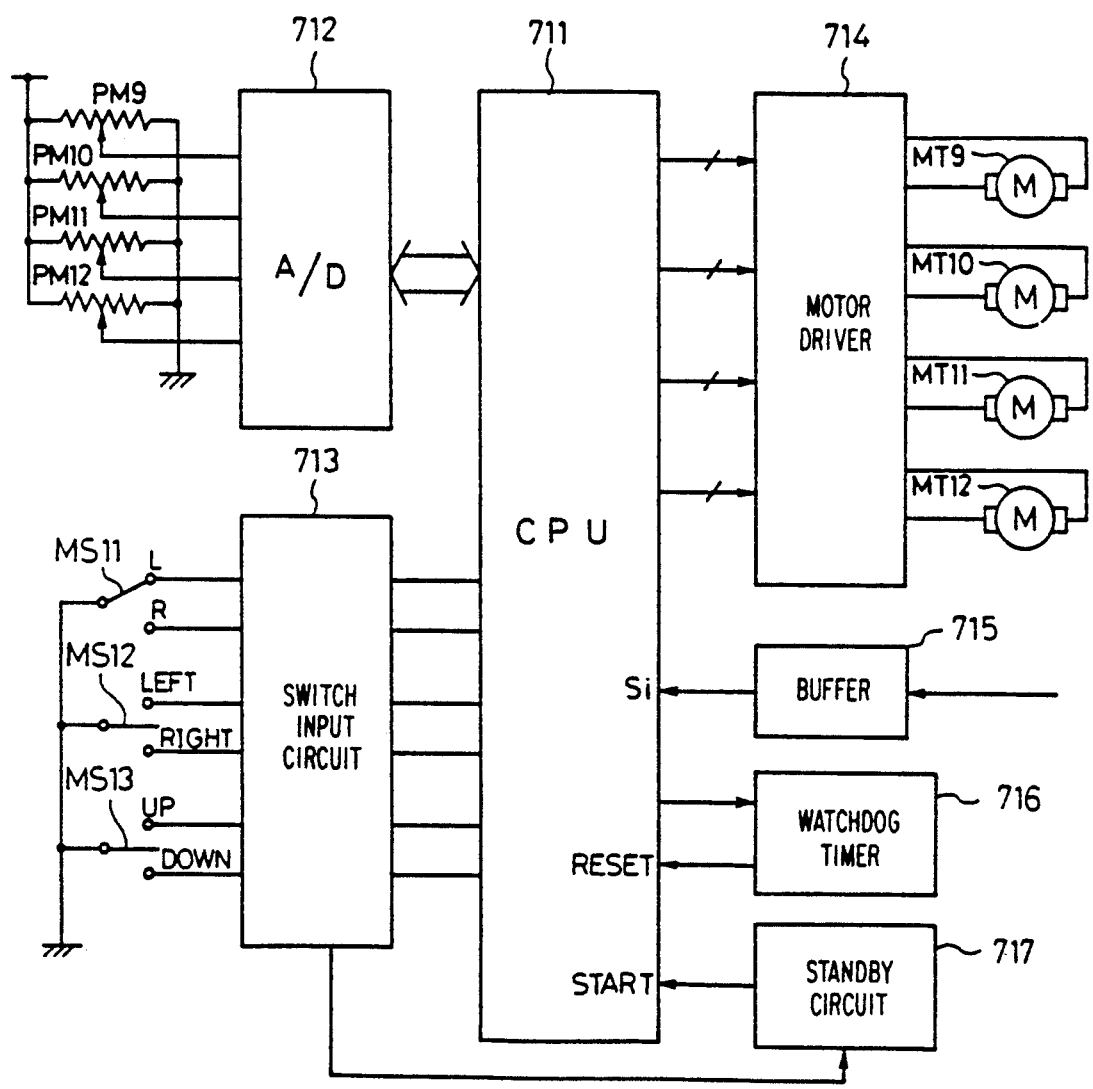

FIGS. 6, 7 and 8 show the arrangement of the master controller 510, the seat controller 610 and the mirror controller 710 shown in FIG. 1. The arrangement of the master controller 510 will be initially described with reference to FIG. 6. The controller 510 essentially comprises a single chip microcomputer 511, an A/D converter 512, a switch input circuit (interface) 513, a motor driver 514, a buffer 515, a watchdog timer 516 and a standby circuit 517.

Three motors MT1, MT2 and MT3 are connected to the driver 514 and serve driving the tilt attitude adjusting mechanism and the telescopic attitude adjusting mechanism of the steering wheel as well as the seat belt anchor attitude adjusting mechanism, which are provided with potentiometers PM1, PM2 and PM3, respectively, for delivering an associated attitude information. An analog electric signal delivered from these potentiometers are fed through the converter 512 to be applied to the microcomputer 511

Manual switches MS1, MS2, MS3 and MS4 deliver commands representing an upward adjustment and a downward adjustment of the tilt attitude, and a shrinkage and an elongation of the telescopic attitude, respectively. These manual switches are also connected to the converter 512. Specifically, together with their associated resistors, the four manual switches MS1 to MS4 constitute a circuitry which varies an analog voltage input to the converter 512 in accordance with the on/off combination of these switches. In this manner, the microcomputer 511 is capable of recognizing the status of the manual switches MS1 to MS4 by reading such voltage from the converter 512. A manual switch MS5 connected to the switch input circuit 513 provides a command indicating the seat belt anchor attitude adjustment.

Switches DRS, PKS, UWS and IG have the following functions:

DRS . . . A door courtesy switch which is turned on when a door of an automobile is opened and which is off when the door is closed.

PKS . . . A parking switch which is turned on when the shift lever 3 of the transmission is located at its P (parking) range, and remains off otherwise.

UWS . . . An unlock warning switch which is turned on when the engine key 2 is inserted into a key cylinder and which is turned off when it is withdrawn.

IGS . . . An ignition switch.

Switches SS0, SS1 and SS3 are used when providing an attitude control command to the entire attitude control system, namely, to all of the steering attitude control mechanism, the seat attitude control mechanism and the mirror attitude control mechanism simultaneously. Specifically, switch SS0 is used to store a prevailing attitude in a memory; switch SS1 is used to select a first set of attitude memories for storage or retrieval of an attitude; and switch SS2 is used to select a second set of attitude memories for storage or retrieval of an attitude.

The motor driver 514 includes a number of relays, and controls the turn-on/off as well as the direction of the current flow through the motors MT1 to MT3 based on the commands supplied from the microcomputer 511 indicating which motors is or are to be turned on or off and in which direction (forward or reverse) it or they should be driven.

The microcomputer 511 is provided with a serial communication capability and when transmitting serial data, such data is output to its terminal SO When serial data is input to its terminal Ti such data can be received. The terminals SO and Si are connected to other controllers shown in FIG. 1 through the buffer 515. Thus, by delivering data such as a command to the terminal SO, the microcomputer 511 is capable of transmitting it to the seat controller 610 and the mirror controller 710, and is also capable of receiving data which is output from the seat controller 610 at its terminal Si.

The watchdog timer 516 monitors the operation of the microcomputer 511, and produces a reset signal in the event of its runaway, and is well known in itself. The purpose of the standby circuit 517 is to deliver a signal which returns the microcomputer 511 to its normal mode when the latter is operating in a sleep mode.

Referring to FIG. 7, the arrangement of the seat controller 610 will be described. It essentially comprises a microcomputer 611, an A/D converter 612, a switch input circuit 613, a motor driver 614, a buffer 615, a watchdog timer 616 and a standby circuit 617. The motor driver 614 has five electric motors MT4, MT5, MT6, MT7 and MT8 connected thereto, which motors serve driving the sliding attitude adjusting mechanism, the reclining attitude adjusting mechanism, the front vertical attitude adjusting mechanism, the rear vertical attitude adjusting mechanism and the head rest attitude adjusting mechanism associated with the driver's seat which have been mentioned previously. Each of these mechanisms has associated position sensor PS4, PS5, PS6, PS7 or PS8, respectively, which delivers information representing the attitude of associated mechanism. The sensors PS4 to PS8 deliver pulse signals, which are counted by the microcomputer 611 to form information representing the attitude of each mechanism.

Manual switches MS6, MS7, MS8, MS9 and MS10 serve producing commands for the adjustment of the sliding attitude, the reclining attitude, the front vertical attitude, the rear vertical attitude and the head rest attitude, respectively. Signals from these switches are fed through the switch input circuit 613 to be applied to the microcomputer 611. The motor driver 614 includes a number of relays, which are operated in accordance with on/off commands and the direction commands for the respective motors as supplied from the microcomputer 611, thereby controlling the turn-on or -off and a direction of energization of the motors MT4 to MT8.

The microcomputer 611 has a serial communication capability, and includes a terminal SO on which data is output when serial data is to be transmitted. It also includes a terminal Si to which serial data may be input, thus receiving such data. The data transmit terminal SO of the microcomputer 611 is connected through the buffer 615 to a data receive terminal Si of the microcomputer 511, while the data receive terminal Si of the microcomputer 611 is connected through the buffer 615 to the data transmit terminal SO of the microcomputer 511 in the master controller. Thus, a bilateral communication is enabled between the microcomputers 611 and 511.

The watchdog timer 616 functions to monitor the operation of the microcomputer 611 and to deliver a reset signal in the event of a runaway thereof, the construction of such timer being known in the art. The purpose of the standby circuit 617 is to deliver a signal which returns the microcomputer 611 to its normal mode when the latter is operating in its sleep mode.

Referring to FIG. 8, the arrangement of the mirror controller 710 will be described. It essentially comprises a microcomputer 711, an A/D converter 712, a switch input circuit 713, a motor driver 714, a buffer 715, a watchdog timer 716 and a standby circuit 717. The motor driver 714 has four electric motors MT9, MT10, MT11 and MT12 connected thereto, which serve driving a mechanism which adjusts a tilting of a mirror mounted on a right-hand door about its horizontal pivot, a mechanism which adjusts a swinging motion of the mirror in the lateral direction about its vertical pivot, a mechanism which adjusts a tilting of a mirror mounted on a left-hand door about its horizontal pivot, and a mechanism which adjusts a swinging motion of the mirror in a lateral direction about its vertical pivot. Each of these mechanisms includes a potentiometer PO9, PO10, PO11 or PO12, which is connected to an input terminal of the converter 710. In this manner, information representing the attitudes of the respective mirrors can be read by the microcomputer 711 through the converter.

Manual switches MS12 and MS13 deliver commands for adjusting the attitude of the respective mirrors in the lateral and in the vertical direction. A manual switch MS11 selects between the left and the right mirror.

The motor driver 714 includes a plurality of relays which are operated in accordance with the turn-on and -off commands and the direction commands for the respective motors as supplied from the microcomputer 711, thus controlling the turn-on/off and the direction of energization of the motors MT9 to MT12.

The microcomputer 711 is also provided with a serial communication capability, thus transmitting and receiving serial data. However, in the present embodiment, only the receiving capability is utilized. Thus, any serial data input to its terminal Si can be received by the microcomputer. The data receive terminal Si of the microcomputer 711 is connected through the buffer 715 to the data transmit terminal S0 of the microcomputer 511 in the master controller. Thus, the microcomputer 711 is capable of receiving data transmitted by the master controller.

The watchdog timer 716 monitors the operation of the microcomputer 711 and deliver a reset signal in the event of a runaway thereof. The purpose of the standby circuit 717 is to deliver a signal which returns the microcomputer 711 to its normal mode when the latter is operating in its sleep mode.

FIGS. 9a, 9b, 9c, 9d, 9e, 9f, 9g and 9h are flow charts illustrating the operation of the microcomputer 511 in the master controller. Initially referring to FIG. 9a which shows a main routine, when the power supply is turned on, the content of a memory, or RAM having a storage battery backup, is examined. Since no significant information is written into the memory, the program proceeds to step 2 where the initialization is executed. Thus, the memory is cleared, the output ports are initialized and the timer or interrupt condition is established, whereupon an initial value is stored in the memory. If any attitude information has been written into the memory, the program skips the initialization at step 2, and proceeds to step 3.

The processing operation which begins with and follows the step 3 goes through a loop, repeating the loop operation with a short period until the power supply is turned off. At step 3, data which is previously stored in a memory is delivered to the output port for actually controlling the energization of the motor. At step 4, the content of the internal timer is examined. If a time length of 20 msec has passed, the program proceeds to a subroutine "analog signal processing" at step 5, which subroutine is periodically executed every 20 msec. At step 6, the status of the number of switches SS0, SS1, SS2, MS5, DRS, PKS, UWS and IGS connected to the input port is read, and the resulting reading stored in a given memory. At step 7, data transmission and reception takes place. Thus, if the memory stores data to be transmitted, it is delivered to the serial transmit terminal SO, thus transmitting it to the seat controller 610 or the mirror controller 710. If data transmitted from the seat controller 610 is input to the serial receive terminal Si, such data is received and stored in a given memory. At step 8, the prevailing mode of operation is identified in accordance with the previous mode of operation and any change which has occurred in the status of the various switches. Available modes of operation include a retract mode, a return mode, a manual mode, a sleep mode, a store mode, a retrieve mode and nonoperational mode. If the mode of operation identified at step 8 is either one of the retract mode, the return mode, the manual mode, the sleep mode, the store mode or the retrieve mode, the program proceeds to the execution of subroutines indicated at steps 15, 16, 17, 18, 19 and 20, respectively.

Each of these modes will be described briefly. The purpose of the retract mode is to position each of the attitude adjusting mechanisms to their predetermined retracted positions which lend themselves to an occupant as he gets on and off the vehicle. This mode is entered in the present embodiment when the engine key 2 is withdrawn from the key cylinder. The purpose of the return mode is to return the individual attitude adjusting mechanisms to their original driving positions from their associated retracted positions. In the present embodiment, this mode is entered when the engine key 2 is inserted into the key cylinder. The purpose of the manual mode is to adjust the attitude of each mechanism in response to and in accordance with the operation of manual switches MS1 to MS5 by the occupant. The purpose of the sleep mode is to switch between a sleep or power saving operation and a normal operation of the microcomputer 511. In the store mode, the prevailing attitude of the respective attitude adjusting mechanism is stored in a designated memory, and this mode is entered whenever the switch SS0 is turned on. The purpose of the retrieve mode is to position the attitude of the individual attitude adjusting mechanisms to the one which is previously stored in an associated memory. In the present embodiment, this mode is entered upon turning either switch SS1 or SS2 in an operational mode other than the store mode.

Figure 9A:
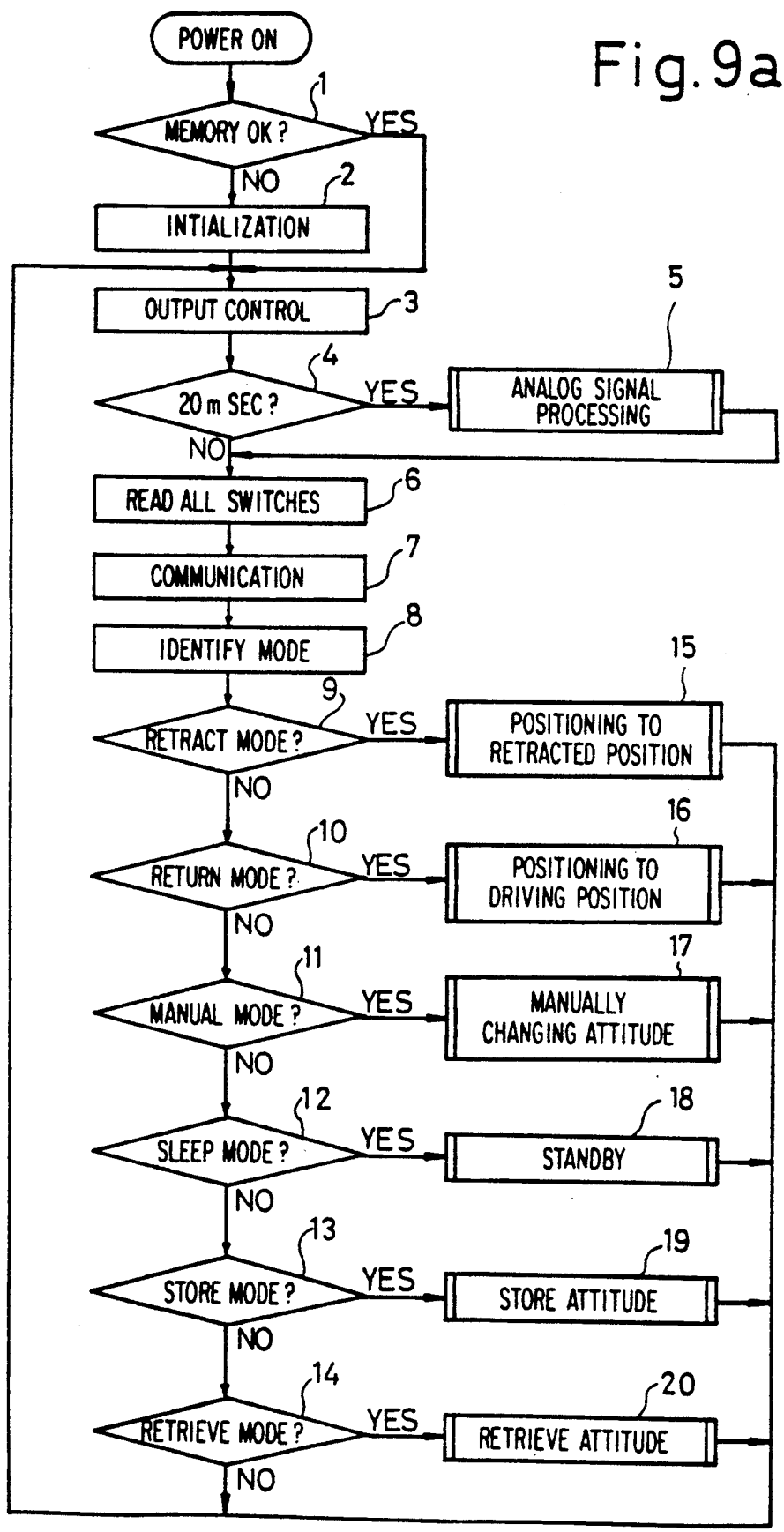

The individual subroutines shown in FIG. 9a will now be described in detail. The analog signal processing operation will be initially described with reference to FIG. 9g. 20 msec timer is initially cleared. Thus, this timer re-starts from 0. A tilt attitude, a telescopic attitude and a seat belt anchor attitude which are delivered by the potentiometers PM1, PM2 and PM3, respectively, are successively sampled, and results stored in an associated memory. In a reduced rate detection processing operation which follows, any reduction in the rate of change in the attitude is recognized for each of sampled attitudes. In a following attitude identification processing operation, each attitude is examined to see if a predetermined position, a stored position or limit position is reached. It is also to be noted that a reading of the manual switches MS1 to MS4 is also executed during the analog signal processing subroutine.

Referring back to FIG. 9b, "retracted attitude positioning" subroutine will be described in detail. Initially a prevailing driving attitude is initially stored in a predetermined "retract" memory at step 31. Commands are concurrently issued to the seat controller 610 and the mirror controller 710 to store the prevailing driving attitude in their associated "retract" memories.

At step 32, the attitude of the telescopic mechanism is examined. Since the mechanism normally assumes driving attitude, it is necessary in order to initiate a retract operation, to proceed to step 34 where the telescopic mechanism begins to be driven to reduce its length while starting the timer TM1. When the telescopic mechanism reaches its minimum length attitude or retract attitude, the program proceeds from step 32 to step 33 where the telescopic mechanism ceases to be driven.

At step 35, the content of the timer TM1 is examined. If the count thereof exceeds 0.3 second, the program proceeds to step 36 where the attitude of the tilt mechanism is examined. Immediately after initiating the retract operation, the tilt mechanism assumes its normal driving attitude. Accordingly, the program proceeds from step 36 to step 38 where the tilt mechanism begins to be driven upward while terminating the operation of the timer TM1. When the attitude of the tilt mechanism reaches its uppermost or retracted position, the program then proceeds from step 36 to step 37 where the attitude adjustment of the tilt mechanism is terminated, followed by executing a retract control of the belt anchor. Accordingly, when the engine key is withdrawn from the key cylinder, the tilt attitude, the telescopic attitude and the belt anchor attitude are automatically established to given retracted positions. In response to a retract command from the master controller 510, various attitudes of the seat are also automatically established to predetermined retracted positions by means of the seat controller 610.

Referring to FIG. 9c, "driving attitude positioning" subroutine will be described in detail. Initially at step 41, "retract" memory is accessed, thus reading the driving attitude information which was stored before the retract operation takes place. At the same time a command is issued to the seat controller 610 to read the driving attitude information from its associated "retract" memory in order to establish the seat attitude accordingly.

At step 42, the attitude of the tilt mechanism is examined. When initiating a return operation, it will be noted that the tilt attitude is different from a corresponding driving attitude, and hence the program proceeds to step 44 where the tilt mechanism begins to be driven downward while starting the timer TM1. When the tilt mechanism has been returned to its original driving attitude, the program proceeds to step 43 where the driving of the tilt mechanism is terminated.

At step 45, the content of the timer TM1 is examined. If the count thereof exceeds 0.3 second, the program proceeds to step 46 where the attitude of the telescopic mechanism is examined. Since the telescopic mechanism does not assume it driving attitude immediately after initiating the return operation, the program proceeds to step 48 where the telescopic mechanism begins to be driven in a direction to increase its length while terminating the timer TM1. After the attitude of the telescopic mechanism has been returned to its driving attitude which it assumed before the retract operation, the program proceeds from step 46 to step 47 where the telescopic mechanism ceases to be driven while the attitude control of the seat belt anchor takes place.

Figure 9D:
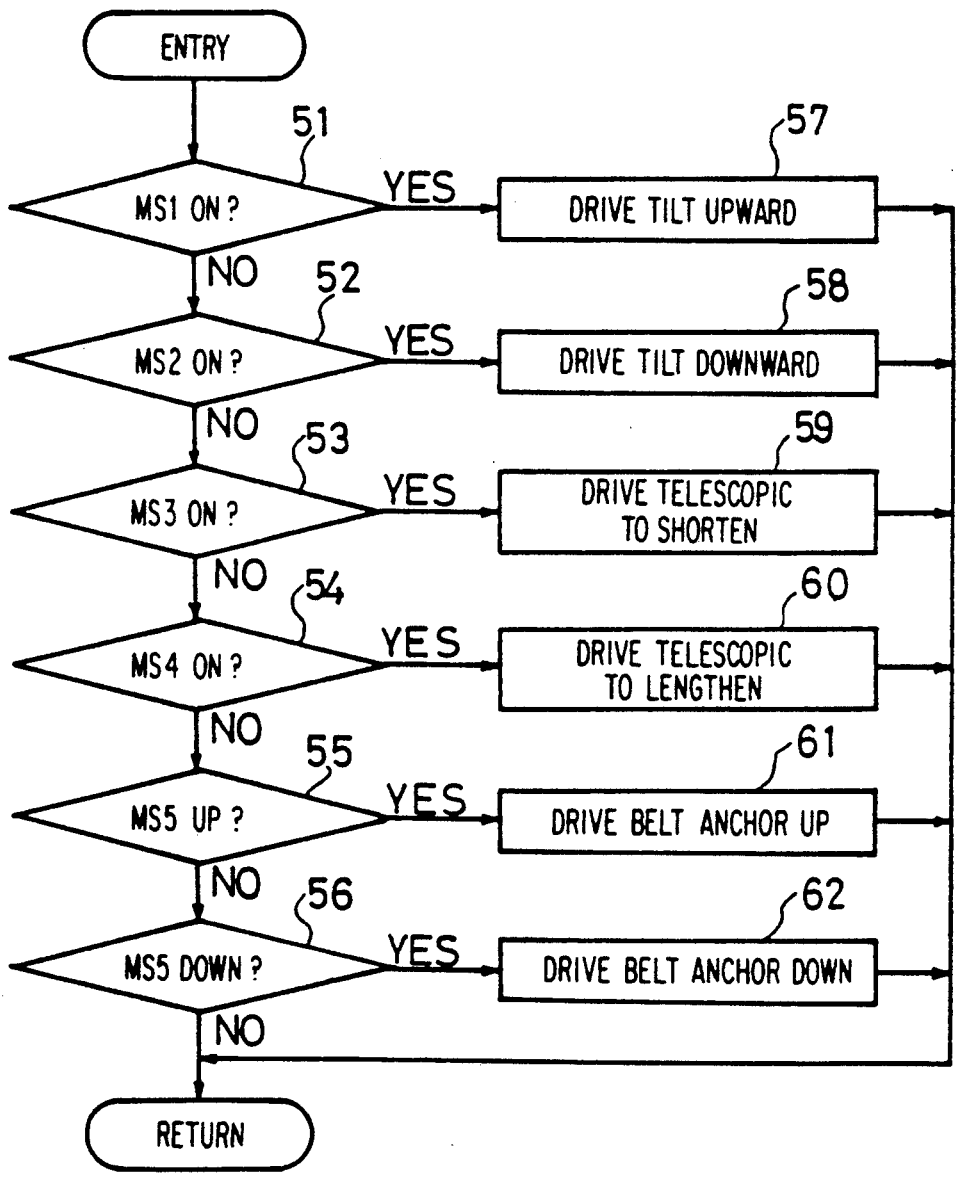

Referring to FIG. 9d, a manual attitude modification will now be described. In this operation, any operation of each manual switch is accompanied by the execution of a corresponding attitude control. Specifically, when the manual switch MS1 is turned on, the steering tilt attitude is modified in the upward direction. When the switch MS is turned on, the tilt attitude is modified in the downward direction. When the switch MS3 is turned on, the steering telescopic attitude is driven in a direction to reduce its length while when the switch MS4 is turned on, the telescopic attitude is driven in a direction to increase its length. When the switch MS5 is thrown to its UP position, the seat belt anchor is driven in the upward direction while it is driven in the opposite or downward direction when the switch MS5 is thrown to its DOWN side.

Figure 9F:
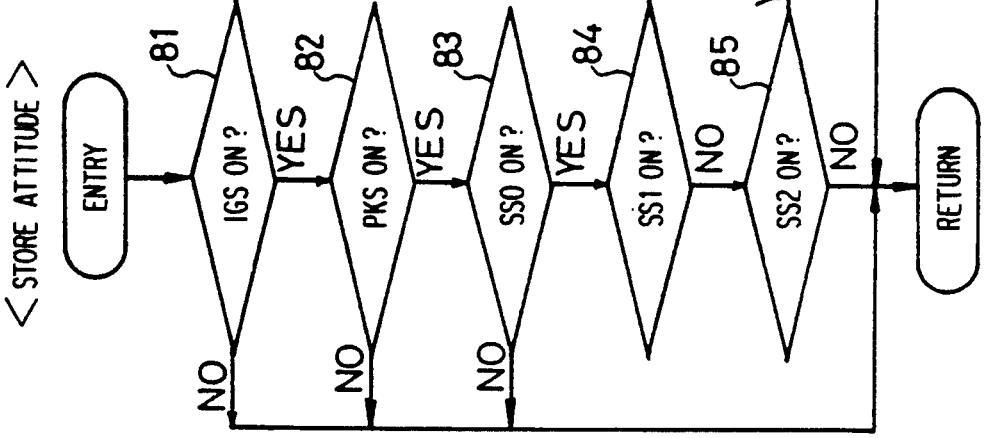
Figure 9E:
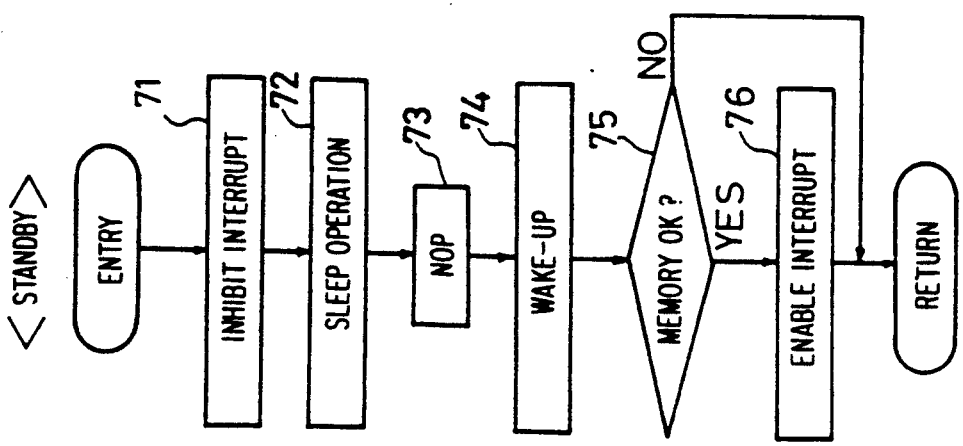

Referring to FIG. 9e, a standby processing operation will be described. Initially at step 71, an interrupt operation is inhibited, and a given sleep operation is executed at step 72. Upon execution of the sleep operation, the microcomputer enters the sleep mode and ceases to operate. No operation takes place at step 73. If the microcomputer 511 is started as by a switch operation, a wake-up step 74 is executed to return from the sleep mode to the normal mode. At step 75, the content of a memory is examined, and an interrupt operation is enabled if it is OK.

Referring to FIG. 9f, "attitude store operation" will be described. At step 81, an ignition switch IGS is examined, at step 82 a parking switch PKS is examined, at step 83 the set switch SS0 is examined, at step 84, "1" switch SS1 is examined, and at step 85, "2" switch SS2 is examined.

When the ignition switch is turned on, the shift lever is thrown to its parking position, and the pair of switches SS0 and SS1 are simultaneously turned on, the program proceeds to step 86, and the current attitude is stored in a first set of attitude memories. At this time, a command is also delivered to the seat controller 610 and the mirror controller 710 to cause them to store their corresponding current attitudes. When the ignition switch is turned on, the shift lever is thrown to its parking position and the pair of switches SS0 and SS2 are turned on simultaneously, the program proceeds to step 87 where the current attitude is stored in a second set of attitude memories. A corresponding command is also delivered to the seat controller 610 and the mirror controller 710 to cause them to store their current attitudes.

Stated differently, in the present embodiment, when "1" switch is turned on while turning the set switch SS0 on, all of the attitudes of the system are registered as a first attitude and stored in its controlling microcomputer. On the other hand, when "2" switch is turned on while turning the set switch SS0 on, all the attitudes of the system are registered as a second attitude, which is then stored in its controlling microcomputer.

Figure 9H:
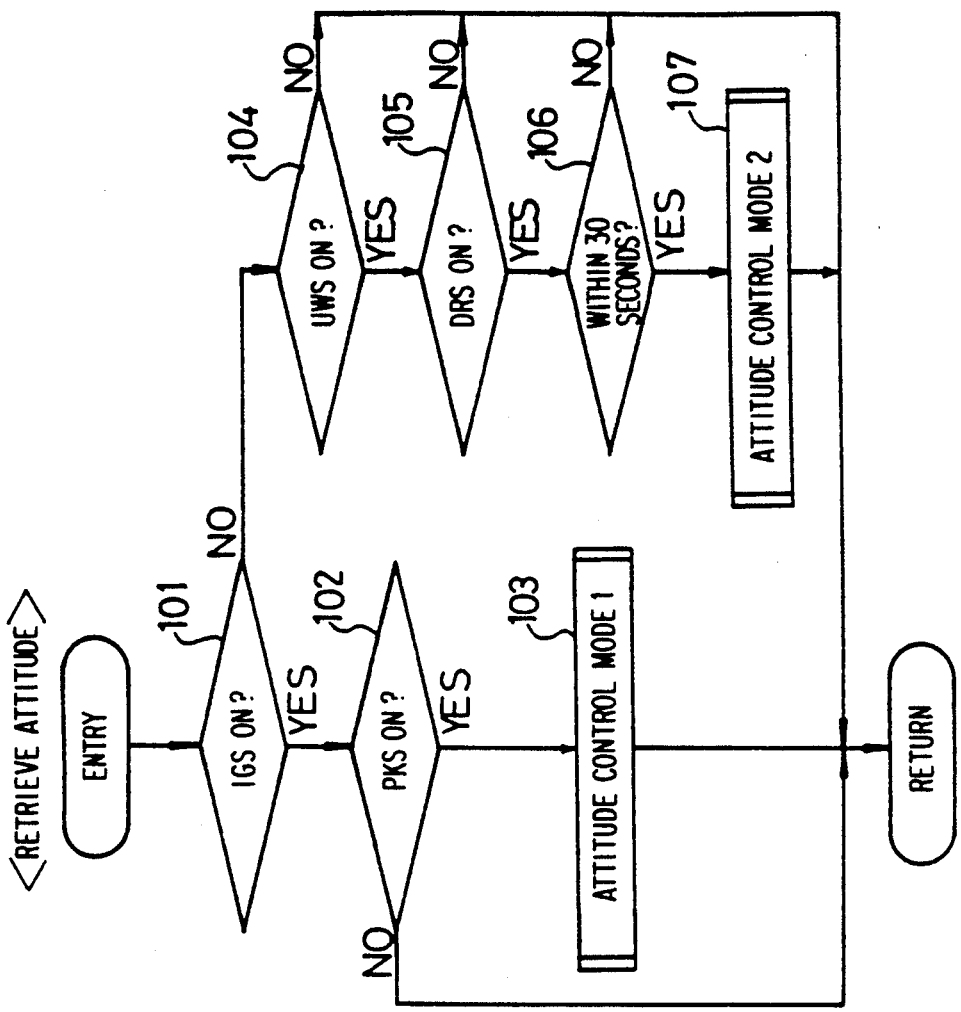
Figure 9G:
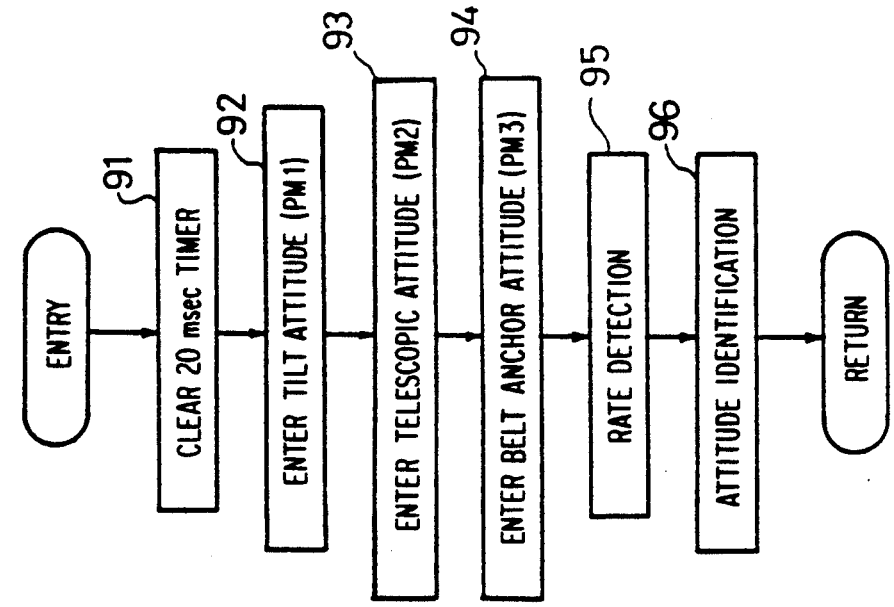

Referring to FIG. 9h, "attitude retrieve" subroutine will be described. At step 101, the ignition switch IGS is examined, at step 102, the parking switch PKS is examined, at step 104, the unlock warning switch UWS is examined, at step 105, the door courtesy switch is examined, and at step 106, it is examined if a time length of 30 seconds has passed since the initial execution of the step.

When the ignition switch is turned on, indicating that the engine is in operation, and the shift lever assumes its parking position, "attitude control mode 1" subroutine represented by step 103 is executed. When the ignition switch is turned off, indicating that the engine is out of operation, the unlock warning switch is turned off, indicating that the engine key is not inserted, and the time which has passed since the door has been closed is within 30 seconds, "attitude control mode 2" subroutine represented by step 107 is executed.

Figure 10C:
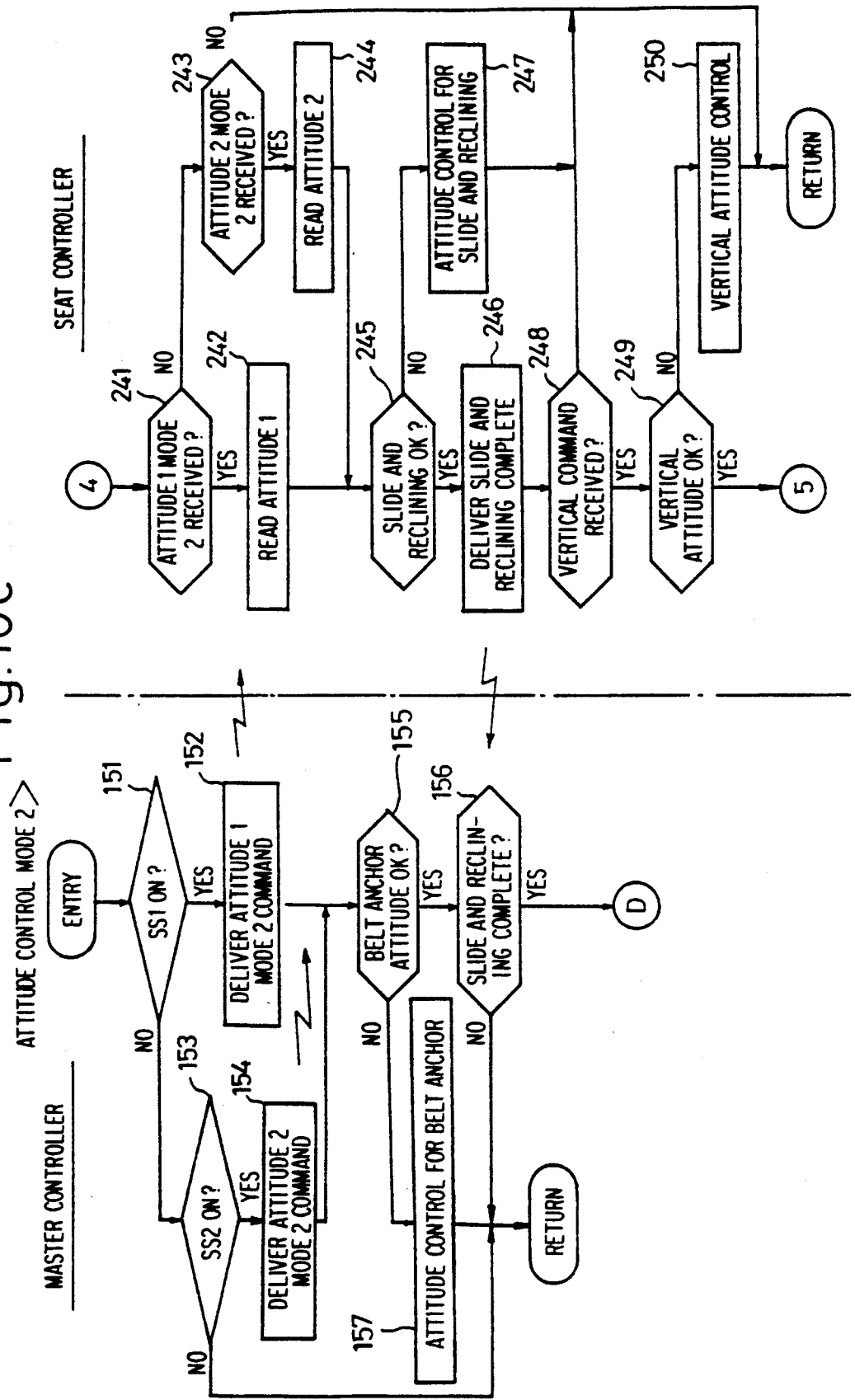

FIGS. 10a and 10b indicate the detail of "attitude control mode 1" subroutine associated with the master controller together with the operation of the seat controller, and FIGS. 10c and 10d indicate the detail of the "attitude control mode 2" subroutine associated with the master controller together with the operation of the seat controller.

While the main routines associated with the seat controller 610 and the mirror controller 710 are not shown in detail, it is to be understood that they remain essentially the same as that of the master controller 510. However, it is to be noted that since the only switches which are directly connected to the seat controller 610 and the mirror controller 710 are the manual switches, any operation which is based on an automatic attitude control or the storage of an attitude is executed in response to various commands delivered by the master controller 510. In addition, it is to be noted that the communication capability of the mirror controller 710 only includes the reception, and does not include the transmitting function. Additionally, it is to be noted that the mirror controller 710 is not provided with any positioning operation which drives the mirror to its retracted position or returns it to a driving position.

The execution of the "attitude control mode 1" subroutine by the master controller 510 (microcomputer 511) will be described initially with reference to FIG. 10a. When "1" switch SS1 is turned on, the program proceeds from step 111 to step 112 where "attitude 1 mode 1" command is delivered to the seat controller and the mirror controller. The purpose of this command is to cause each controller to start a series of operations to establish the attitude of various mechanisms associated therewith to the attitudes which are stored in the first set of attitude memories in the respective controller.

When "2" switch SS2 is turned on, the program proceeds from step 113 to step 114 where "attitude 2 mode 1" command is delivered to the seat controller and the mirror controller. The purpose of such command is to cause the respective controller to start a series of operations to establish the attitude of the associated mechanism to the attitudes which are stored in the second set of attitude memories in the respective controllers.

After executing either step 112 or 114, the program then proceeds to step 115 where it is determined whether a T&T (tilt and telescope) execution command which should be delivered by the seat controller has been received by the master controller. The program proceeds to step 117 if such command has been received, and proceeds to step 116 otherwise.

When T&T execution command has been received, the master controller proceeds to step 117 in response thereto, where it distinguishes if a tilt attitude or the telescopic attitude is at a target position. Specifically, the current tilt attitude and the telescopic attitude are compared against attitudes which are stored in attitude memory 1 or attitude memory 2. Obviously, the current attitude cannot be the target attitude immediately after the execution of "attitude control mode 1", and hence the program proceeds to step 119 where the master controller functions to position the tilt mechanism and the telescopic mechanism connected thereto to drive toward their target positions.

When it is detected that the tilt attitude and the telescopic attitude have reached the target positions at step 117, the program then proceeds to step 118 where T&T complete signal is delivered to the seat controller through the serial communication line, informing to the seat controller that the adjustment of the tilt and the telescopic attitudes has been completed. At step 120, the current attitude of the seat belt anchor which is controlled by the master controller itself is compared against the attitude stored in the attitude memory 1 or attitude memory 2, thus seeing if the current attitude coincides with the target attitude. Initially, the current attitude of the seat belt anchor cannot coincide with the target attitude, and hence the program proceeds from step 120 to step 122.

At step 122, the attitude adjusting mechanism associated with the seat belt anchor is controlled so as to bring the detected attitude of the seat belt anchor into coincidence with the target attitude. When the current attitude of the seat belt anchor is found to coincide with the target attitude at step 120, the program proceeds to step 121 where a belt anchor complete signal is delivered to the seat controller through the serial communication line, thus informing the completion of the adjustment of the attitude of the belt anchor.

If the program proceeds to step 116 as a result of the failure of receiving T&T execution command at step 115, the reception or not of the belt anchor execution command which should be delivered by the seat controller is examined. Said command has been received, the program proceeds to step 131 shown in FIG. 10b.

At step 131, the current attitude of the seat belt anchor which is controlled by the master controller itself is examined to see if it coincides with the target attitude. Initially, the current attitude of the seat belt anchor cannot coincide with the target attitude, and hence the program proceeds from step 131 to step 133 where the attitude adjusting mechanism of the seat belt anchor is controlled to bring the seat belt anchor from the detected attitude into coincidence with the target attitude. If the current attitude of the seat belt anchor is found to coincide with the target attitude at step 131, the program proceeds to step 132 where the belt anchor complete signal is fed to the seat controller through the serial communication line, thus informing the completion of the adjustment of the attitude of the belt anchor.

The program proceeds from step 132 to step 134 where the current tilt attitude and the telescopic attitude are examined if they coincide with the target attitudes. If the adjustment of these attitudes are completed, the program proceeds to step 135 where the reception or not of the seat attitude complete signal which should be delivered by the seat controller is examined. If such signal has been received at step 135, the program then proceeds to step 136 where attitude control complete processing operation is executed.

The operation of the seat controller during the execution of the "attitude control mode 1" by the master controller will be described with reference to FIG. 10a. At step 201, it is initially examined if "attitude 1 mode 1" command which should be delivered by the master controller at step 112 has been received by the seat controller. If the command has been received, the program for the seat controller proceeds to step 202 where the attitude information which has been stored in the attitude memory 1 of the seat controller is read. Conversely, if the "attitude 2 mode 1" command which should be delivered by the master controller at step 114 has been received by the seat controller at step 203, the program for the seat controller proceeds to step 204 where the attitude information which is stored in the attitude memory 2 of the seat controller is read. After either step 202 or 204, the current seat attitudes (slide position, reclining position, front vertical position, the rear vertical position and the head rest position) ar examined.

The program proceeds to step 210 if the slide position 1 or 2 is located forward of the current position, if the reclining position 1 or 2 assumes a position which is more forwardly leaned than the current position, or if both the seat slide position and the reclining position assume either attitude 1 or 2. In this instance, the seat controller delivers "T&T execution command" to the master controller through the serial communication line.

Step 211 is then executed, and it is examined if T&T complete signal which should be delivered by the master controller has been received. If T&T complete signal is found to have been received at step 211, the program then skips to step 222. Alternatively, if the slide position 1 or 2 is located rearward of the current position and the reclining position assumes an attitude which is leaned rearwardly as compared with the current position, the program proceeds through steps 206, 207, 208 (and 209) to step 221 where "belt anchor execution command" is delivered to the master controller through the serial communication line.

At step 222, it is examined if the attitude control of the seat sliding and reclining positions has been completed. If not completed, the program proceeds to step 223 where the seat controller executes the attitude control by bringing the seat sliding mechanism and the reclining mechanism connected therewith into coincidence with the attitude information which is stored in its attitude memory 1 or attitude memory 2.

When the attitude control of the sliding and the reclining position is found to have been completed at step 222, the program then proceeds to step 224 where it is examined if "belt anchor complete" signal which should be delivered by the master controller has been received. If the signal has already been received, the program proceeds to step 225 where it is examined if "T&T complete" signal which should be delivered by the master controller has been received. If this signal has already been received, the program proceeds to step 226, or proceeds to step 210 otherwise.

At step 226 the seat controller examines if the attitudes of the front vertical mechanism and the rear vertical mechanism connected therewith coincide with target attitudes which are stored in its attitude memory 1 ment when attitude 1 or 2 mode 1 command has been received by the mirror controller.

TABLE 1

| Direction of Seat Movement | | Overall Sequence of Operations |
|---|---|---|
| SL | RL | |
| aft | fore | RL/BA →> SL > —> < TI/TE > —> VT —> HR |
| aft | aft | SL/BA →> RL > —> < TI/TE > —> VT —> HR |
| fore | fore | TI/TE > —> < RL/BA —> SL —> VT —> HR |
| fore | aft | TI/TE > —> < SL/BA —> RL —> VT —> HR |
|  | fore | TI/TE > —> < RL/BA > —> VT —> HR |
|  | aft | RL/BA > —> < TI/TE > —> VT —> HR |
|  | stop | TI/TE > —> BA —> VT —> HR |

Note:
SL: slide,
RL: recline,
BA: belt anchor,
TI: tilt,
TE: telescopic,
VT: vertical,
HR: head rest.
The front and rear operations take place concurrently for VT.

(or attitude memory 2). If the adjustment of the vertical attitude is not complete, the program proceeds to step 227 where the seat controller executes the attitude control until the attitudes of the front and the rear vertical mechanism are brought into coincidence with the target attitudes stored in its attitude memory 1 (or attitude memory 2). If the attitude control of the front and the rear vertical mechanism has been completed at step 226, the program proceeds to step 228 where the current attitude of the head rest is compared against a target attitude. If the attitude or elevation of the head rest is not yet adjusted, the program proceeds to step 230 where the head rest is positioned at the target attitude. If the attitude control of the head rest is found to have been completed at step 228, the program proceeds to step 229 where "seat attitude complete" signal is delivered to the master controller, informing it to this effect. Then follows a given attitude control complete processing operation.

A sequence of operations which take place during the attitude control mode 1 can be summarized as indicated in Table 1 below. Specifically, as a criterion to determine the sequence of the operations to occur, the direction of the sliding and the reclining movement which has a greater influence upon the magnitude of a free space left around a driver is chosen. If either one of these operations should occur in the rearward direction, such operation should precede either tilting or telescopic operation in order to save a greater free space before other operations such as the tilting or telescoping operation is to be executed. Since the operation of the mirror has no influence whatsoever upon the remaining operations, the mirror operation is initiated at the moment when attitude 1 or 2 mode 1 command has been received by the mirror controller.

Referring to FIG. 10c, the operation of the master controller 510 (microprocessor 511) during the execution of "attitude control mode 2" subroutine, namely, when the attitudes of the various mechanisms should be returned from their retracted positions to those positions which are stored in the first or the second set of attitude memories will now be described.

When "1" switch SS1 is turned on, the program for the master controller proceeds from step 151 to step 152 where "attitude 1 mode 2" command is delivered to both the seat controller and the mirror controller. These commands causes the respective controllers to start a series of operations for establishing the attitudes of the respective mechanisms associated therewith to the attitudes stored in the first set of attitude memories (or memory 1) in the associated controllers.

When "2" switch SS2 is turned on, the program for the master controller proceeds from step 153 to step 154 where "attitude 2 mode 2" command is delivered to the seat controller and the mirror controller. Each of these commands causes the respective controller to start a series of operations for establishing the various mechanisms to the attitudes which are stored in the second set of attitude memories (or attitude memory 2) in the associated controller.

After executing either step 152 or 154, the program proceeds to step 155 where it is examined whether the current attitude of the seat belt anchor which is controlled by the master controller itself coincides with the target attitude. Initially, the attitude of the belt controller has not yet been adjusted, so that the program proceeds to step 157 where the attitude control to bring the belt anchor to its target attitude is executed. If it is found at step 155 that the attitude control of the seat belt anchor has been completed, the program proceeds to step 156 where it is examined if a complete signal for the seat sliding and reclining positions, which should be delivered by the seat controller, has been received, if the complete signal has been received, the program proceeds to step 161 (see FIG. 10d).

At step 161, an unlock warning flag FUW is examined. This flag is normally cleared to "0", and hence the program proceeds to step 162 where the unlock warning switch UWS is examined. When the switch UWS is off, indicating that the engine key has been withdrawn from the key cylinder, the program proceeds to step 163 where a vertical flag FVTCL is set to "1". A vertical command is transmitted to the seat controller through the serial communication line at step 164, and thereafter the program proceeds to step 169.

Conversely, when the switch UWS is found to be on at step 162, indicating that the engine key remains inserted into the key cylinder, the program proceeds to step 164 where the unlock warning flag FUW is set to "1", followed by proceeding to step 166 where it is examined if the attitudes of the tilt and the telescopic mechanism which are controlled by the master controller itself coincide with the target attitudes. Since both the tilting attitude and the telescopic attitude remain unadjusted initially, the program proceeds to step 168 where the attitude control of the tilt and the telescopic mechanism is executed. When the attitude control of the tilt and the telescopic mechanism is found to have been completed at step 166, the program proceeds to step 167 where the vertical flag FVTCL is examined. If the flag FVTCL is not equal to "1", indicating that the vertical attitude is not still adjusted, the execution of step 165 follows, which causes the seat controller to adjust the vertical attitude. At step 169, it is examined if "seat attitude complete" signal which should be delivered by the seat controller has been received. If this signal has been received, the program proceeds to step 170 where a given attitude control complete processing is executed.

The operation of the seat controller during the execution of the "attitude control mode 2" by the master controller will now be described with reference to FIG. 10c. When "attitude 1 mode 2" command which should be delivered by the master controller at step 152 has been received by the seat controller, the program therefor proceeds from step 241 to step 242 where attitude information which has been stored in the attitude memory 1 in the seat controller is read. If "attitude 2 mode 2" command which should be delivered by the master controller at step 154 has been received by the seat controller, the program therefor proceeds from step 243 to step 244 where attitude information which is stored in the attitude memory 2 of the seat controller is read.

After the execution of either step 242 or 244, the program proceeds to step 245 where it is examined if the current attitudes of the seat sliding and the reclining mechanism which are controlled by the seat controller itself coincide with the target attitudes. Since the attitudes of the seat sliding and the reclining mechanism remain unadjusted initially, the program proceeds from step 245 to step 247 where the attitudes of the seat sliding and the reclining mechanism are controlled to be brought into coincidence with stored target attitudes.

When it is found at step 245 that the attitude control of the seat sliding and the reclining mechanism has been completed, the program proceeds to step 246 where a signal representing the completion of an attitude control of the seat sliding and the reclining mechanism is delivered to the master controller. At step 248, it is examined if the vertical command which should be delivered by the master controller at step 265 has been received. If such command has been received, the program proceeds to step 249 where it is examined if the attitudes of the front and the rear vertical mechanism which are controlled by the seat controller itself coincide with stored target attitudes. Since the vertical attitude do not coincide with the target attitudes initially, the program proceeds to step 250 where a vertical control of the front and the rear vertical mechanism is executed to bring them into coincidence with the target attitudes.

If it is found at step 249 that the attitude control of the vertical mechanisms has been complete, the program then skips to step 261 shown in FIG. 10d' where it is examined if the attitude of the head rest which is controlled by the seat controller itself coincides with a stored target attitude. When the attitude of the head rest remains unadjusted, the program proceeds to step 262 where an attitude control is executed to bring the attitude of the head rest into coincidence with the stored target attitude. When it is found at step 261 that the attitude control of the head rest has been completed, the program then proceeds to step 263 where "seat attitude complete" signal is delivered to the master controller. The program then proceeds to step 264 where a given attitude control complete processing is executed.

A sequence of operations which take place in the attitude control mode 2 mentioned above can be summarized in Tables 2 and 3 indicated below.

TABLE 2

| Direction of RL Movement | Groups | | |
|---|---|---|---|
| | A | B | C |
| fore | RL → SL BA | → VT | → HR |
| aft | SL → RL BA | → VT | → HR |

Note: RL: reclining, SL: sliding, VT: vertical, BA: belt anchor, HR: head rest. The front and the rear operation takes place concurrently for VT.

Table 2 indicates a sequence of retrieval when the unlock warning switch UWS remains off. At this time, no tilting or telescoping operation takes place since when the switch UWS remains off, the steering mechanism remains at its retracted position as is the tilting and the telescopic mechanism, and it is preferred that the tilting and the telescoping operation be operated when the switch UWS is turned on when a driver occupies his seat or when the key is inserted.

TABLE 3

| key inserted during operation A | operation A → | operation B → | operation C → |

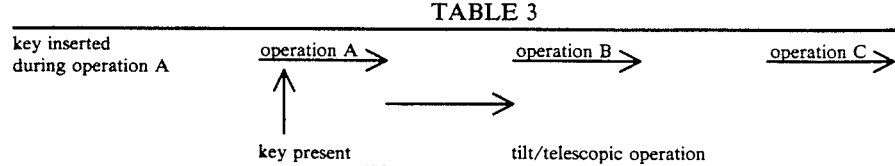

key present      tilt/telescopic operation
*If operation A takes effect, tilt/telescopic operation takes place upon completion of operation A.

TABLE 3-continued

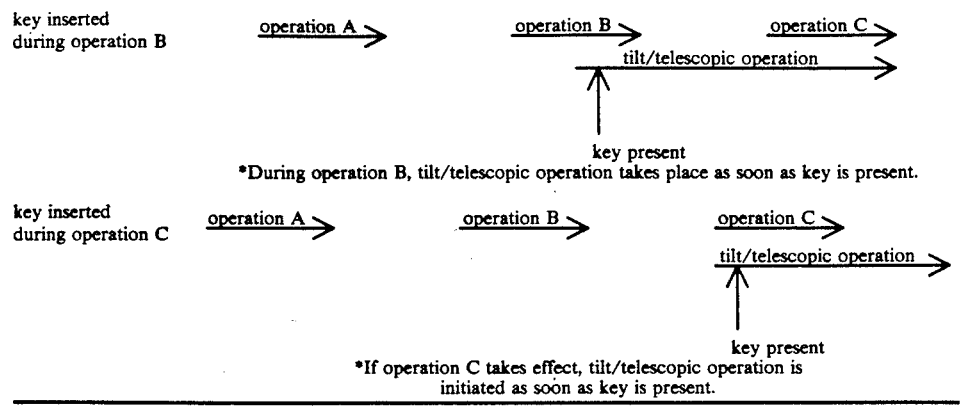

Table 3 shows a sequence of operations which take place when the key is inserted and the switch UWS is turned on. Thus, when the operation which takes place when the switch UWS remains off is divided into three domains A, B and C indicated in FIG. 2, the operation can be explained as follows:

When the switch UWS is turned on during the operation A, the tilting/telescoping operation is executed subsequent to the termination of the operation A, and upon its completion, the operations B and C follow.

When the switch UWS is turned on during B and C operations, the tilting/telescoping operation start at that point in time. This is because a concurrent operation of the sliding/reclining or tilting/telescoping operation is undesirable because there influences upon each other.

As described, the invention relates to attitude control system including a plurality of controllers which perform mutually different operations upon a plurality of attitude adjusting mechanisms. In this instance, an attitude control command representing an overall attitude control and delivered by switch means (as by SS0, SS1, SS2, etc. in the disclosed embodiment) can be reliably recognized by all of the controllers. Accordingly, a switch operation may take place at any desired timing without causing a likelihood that certain controllers may execute an attitude control while the remaining controllers may not execute a corresponding attitude control, resulting in a failure of conducting such attitude control on part of the mechanisms.

In addition, an attitude control execution command and an attitude control complete signal are transmitted between the plurality of controllers depending on the current status of the associated adjusting mechanisms, thereby preventing any likelihood of collision occurring between a plurality of attitude adjusting mechanisms such as a steering wheel and a head rest.

What we claimed is:

1. An attitude control system for onboard units comprising:
    a plurality of attitude adjusting means each including electric drive means operable to adjust the attitude of each of mutually different onboard units;
    at least one master switch means for delivering a primary attitude control command related to all of the plurality of attitude adjusting means;
    master electronic control means operable in accordance with a given control program and connected to the master switch means and at least one of the plurality of attitude adjusting means for controlling the at least one connected attitude adjusting means in response to the primary attitude control command and for delivering a secondary attitude control command in response to the primary attitude control command; and
    slave electronic control means operable in accordance with an independent control program which is separate from the program associated with the master electronic control means and connected to the remaining ones of the plurality of attitude adjusting means and the master electronic control means for controlling the connected ones of the plurality of attitude adjusting means in response to the secondary attitude control command delivered by the master electronic control means.

2. The attitude control system according to claim 1 in which the attitude adjusting means includes at least one first adjusting mechanism which adjusts the attitude of a seat, and at least one second adjusting mechanism which adjusts the attitude of a steering column, the master and the slave electronic control means being operative to inhibit the operation of the second adjusting mechanism at least until the operation of the first adjusting mechanism is completed whenever the presence of the attitude control command to the second adjusting mechanism is detected during the operation of the first adjusting mechanism.

3. The attitude control system according to claim 1 in which one of the master and the slave electronic control means controls the plurality of attitude adjusting means, the sequence in which these attitude adjusting means are subject to an attitude control being switched in accordance with the condition of attitude control which is performed by the other of the master and the slave electronic control means.

4. The attitude control system according to claim 1 in which the attitude adjusting means includes at least a seat slide adjusting mechanism and a seat reclining adjusting mechanism, the master and the slave electronic control means automatically changing the sequence in which the seat slide adjusting mechanism and the seat reclining adjusting mechanism are adjusted depending on the direction in which the attitude of the seat reclining adjusting mechanism is controlled.

5. The attitude control system according to claim 1 in which the attitude adjusting means includes at least one first adjusting mechanism which adjusts the attitude of a seat, and at least one second adjusting mechanism which adjusts the attitude of a steering column, the master and the slave electronic control means automatically changing the sequence in which the seat attitude and the steering column attitude are controlled depending on the direction in which the seat attitude is controlled.

6. The attitude control system according to claim 5 in which the attitude adjusting means includes a first adjusting mechanism which adjusts a sliding and a reclining attitude of a seat, and a second adjusting mechanism which adjusts a tilting and a telescoping attitude of a steering column, the master and the slave electronic control means automatically changing the sequence in which these attitude control take place depending on a combination of directions in which the seat sliding and the seat reclining attitude are adjusted.

7. An attitude control system for onboard units comprising:
- a plurality of attitude adjusting means each including electric drive means operable to adjust the attitude of each of mutually different onboard units;
- at least one master switch means for delivering a primary attitude control command related to all of the plurality of attitude adjusting means;
- master electronic control means operable in accordance with a given control program and connected to the master switch means and at least one of the plurality of attitude adjusting means for controlling the at least one connected attitude adjusting means in response to the primary attitude control command and for delivering a secondary attitude control command in response to the primary attitude control command; and
- slave electronic control means operable in accordance with an independent control program which is separate from the program associated with the master electronic control means and connected to the remaining ones of the plurality of attitude adjusting means and the master electronic control means for controlling the connected ones of the plurality of attitude adjusting means in response to the secondary attitude control command delivered by the master electronic control means;
- said master electronic control means delivers information which depends on the attitude or attitudes of a first set of attitude adjusting means which is or are controlled by the master electronic control means, to be transmitted to the slave electronic control means;
- said slave electronic control means delivers information which depends on the attitude or attitudes of a second set of attitude adjusting means which are controlled by the slave electronic control means, to be transmitted to the master electronic control means;
- said master electronic control means responding to the attitude information from the second set of attitude adjusting means which is delivered by the slave electronic control means by controlling the first set of attitude adjusting means; and
- said slave electronic control means responding to the attitude information of the first set of attitude adjusting means which is delivered by the master electronic control means by controlling the second set of attitude adjusting means.

* * * * *